(12) United States Patent
Tobiason

(10) Patent No.: US 11,187,521 B2
(45) Date of Patent: Nov. 30, 2021

(54) ROTATING CHROMATIC RANGE SENSOR SYSTEM WITH CALIBRATION OBJECT AND METHOD

(71) Applicant: Mitutoyo Corporation, Kanagawa-ken (JP)

(72) Inventor: Joseph Daniel Tobiason, Bothell, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 0 days.

(21) Appl. No.: 16/861,024

(22) Filed: Apr. 28, 2020

(65) Prior Publication Data

US 2021/0333093 A1  Oct. 28, 2021

(51) Int. Cl.
  *G01B 11/02*  (2006.01)
  *G01B 11/00*  (2006.01)
(52) U.S. Cl.
  CPC .......... *G01B 11/026* (2013.01); *G01B 11/007* (2013.01); *G01B 2210/50* (2013.01)
(58) Field of Classification Search
  CPC ............... G01B 11/026; G01B 11/007; G01B 2210/50; G01B 21/042; G01B 3/30
  USPC ........................................ 356/614–624, 145
  See application file for complete search history.

(56) References Cited

U.S. PATENT DOCUMENTS

| | | | |
|---|---|---|---|
| 4,908,951 A | 3/1990 | Gurny | |
| 5,825,666 A | 10/1998 | Freifeld | |
| 6,067,165 A | 5/2000 | Matsumiya et al. | |
| 7,873,488 B2 | 1/2011 | Nahum et al. | |
| 7,876,456 B2 | 1/2011 | Sesko | |
| 7,990,522 B2 | 8/2011 | Sesko | |
| 8,194,251 B2 | 6/2012 | Emtman et al. | |
| 8,229,694 B2 | 7/2012 | Nakagawa et al. | |
| 8,817,240 B2 | 8/2014 | Jones et al. | |
| 9,151,602 B2 | 10/2015 | Noda et al. | |
| 9,746,303 B2 | 8/2017 | Nakagawa et al. | |
| 9,952,045 B2 | 4/2018 | Yasuno | |
| 10,429,167 B2 | 10/2019 | Nakagawa et al. | |
| 2006/0109483 A1* | 5/2006 | Marx | G01B 11/24 356/609 |
| 2010/0208486 A1* | 8/2010 | Gladnick | G01B 11/026 362/551 |
| 2012/0050722 A1* | 3/2012 | Emtman | G01B 11/026 356/123 |

(Continued)

*Primary Examiner* — Isiaka O Akanbi
(74) *Attorney, Agent, or Firm* — Seed IP Law Group LLP

(57) ABSTRACT

A calibration configuration for a chromatic range sensor (CRS) optical probe of a coordinate measurement machine (CMM) includes a calibration object. The calibration object includes at least a first nominally cylindrical calibration surface having a central axis that extends along a Z direction that is intended to be aligned approximately parallel to a rotation axis of the CRS optical probe. The first nominally cylindrical calibration surface is arranged at a known first radius R1 from the central axis that extends along the Z direction. A first set of angular reference features is formed on or in the first nominally cylindrical calibration surface. The angular reference features are configured to be sensed by the radial distance sensing beam and are located at known angles or known angular spacings around the central axis from one another on or in the first nominally cylindrical calibration surface.

24 Claims, 32 Drawing Sheets

(56) References Cited

U.S. PATENT DOCUMENTS

| | | | |
|---|---|---|---|
| 2012/0050723 A1* | 3/2012 | Emtman | G01B 11/14 356/123 |
| 2015/0159998 A1* | 6/2015 | Altendorf | G01B 11/005 356/635 |
| 2015/0211850 A1* | 7/2015 | Harsila | G02B 7/1821 356/4.01 |
| 2017/0248399 A1 | 8/2017 | Takahama | |

* cited by examiner

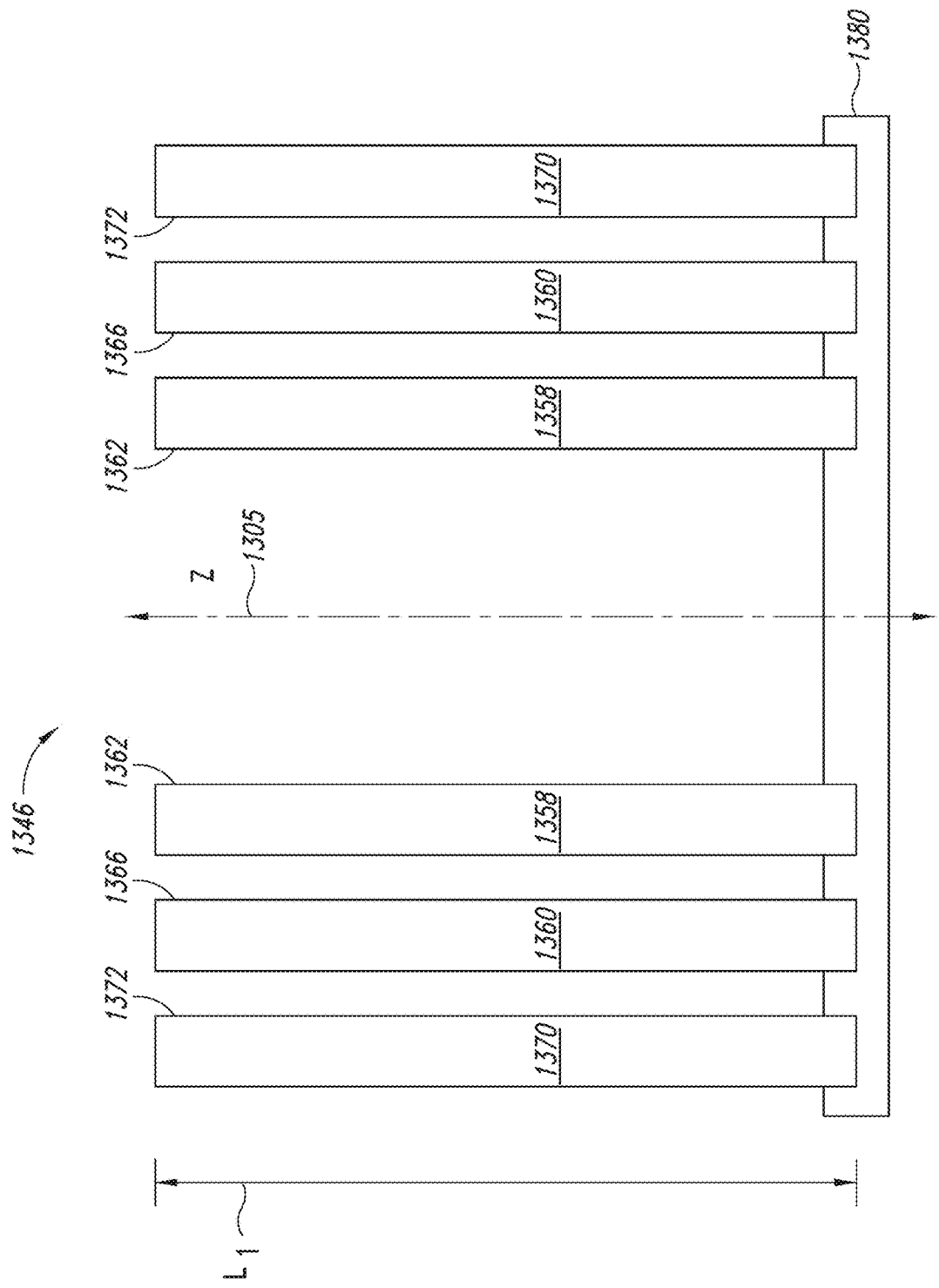

US 11,187,521 B2

ROTATING CHROMATIC RANGE SENSOR SYSTEM WITH CALIBRATION OBJECT AND METHOD

BACKGROUND

Technical Field

The disclosure relates generally to precision measurement instruments, and more particularly to chromatic range sensor optical probes such as may be used with coordinate measurement machines (CMMs) for determining measurements of workpieces.

Description of the Related Art

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes (e.g., triangulation probes) utilize light to measure workpiece surface points, and some optical probes comprise video cameras which are used to image 2-D sections of the workpiece surface (e.g., stereo vision systems, or structured light systems). In some systems, the coordinates of the geometric elements of the workpiece are determined via image processing software.

Certain "combined" coordinate measuring machines that use both optical and mechanical measuring sensors are also known. One such device is described in U.S. Pat. No. 4,908,951, which is hereby incorporated by reference in its entirety. The described apparatus has two spindles, one that carries the mechanical probe, and one that holds a video camera having a beam path into which a laser probe is simultaneously reflected for making measurements in the Z coordinate, that is, along the optical axis of the video camera.

U.S. Pat. No. 5,825,666, which is hereby incorporated by reference in its entirety, describes an optical coordinate measuring machine wherein an optical touch probe of the device has a first target on the distal end thereof, on the contact element of a standard probe. The standard probe is mounted to a video camera to image the target on the camera. Movement and position of the target in the X and Y coordinates is indicated by the machine's computer image processing system. A second target is mounted to the proximal end of the probe and indicates movement and position in the Z coordinate. The second target may obscure a photo detector, but can be focused on the camera by a light beam parallel to the X, Y plane. There can be two second targets illuminated by orthogonal beams parallel to the X, Y plane. Rotation around the Z axis then may be calculated by the computer when star probes are used. Auto changing racks are also disclosed for holding multiple probes, a probe holder, and lenses for selective mounting on the camera.

Optical probes and/or coordinate measurement machines may also contain rotating elements, for example, to rotate an optical pen of an optical probe with respect to an axis. In addition, optics elements may include reflective elements placed in the path of a source beam, directing measurement beams in a different direction than the source beam.

A related issue involves errors in measurements taken by a coordinate measurement machine using a rotating optical pen, such as radius, azimuth angle, Z distance errors, which may have nonlinear components. Conventionally, calibration may be performed using an interferometer to address such errors. Calibration using an interferometer, however, is difficult to perform accurately, particularly for rotating probes. In addition, such calibration may be difficult to perform at a measurement site, such as a manufacturing facility.

A configuration and method for calibrating a chromatic range sensor optical probe as coupled to a coordinate measurement machine that provides improvements with respect to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is provided for providing calibration data for correcting misalignment errors for a rotating chromatic range sensor configuration. The rotating chromatic range sensor configuration is configured to direct a radial distance sensing beam along a radial direction relative to a rotation axis, and rotate the radial distance sensing beam about the rotation axis. A calibration object is provided which has at least a first nominally cylindrical calibration surface having a central axis that extends along a Z direction that is intended to be aligned approximately parallel to the rotation axis. The first nominally cylindrical calibration surface is arranged at a known first radius R1 from the central axis that extends along the Z direction and includes a first set of angular reference features formed on or in the first nominally cylindrical calibration surface. The angular reference features are configured to be sensed by the radial distance sensing beam and are located at known angles or known angular spacings around the central axis from one another on or in the first nominally cylindrical calibration surface. The calibration object is arranged in a relationship relative to the rotating chromatic range sensor configuration. The direction of the rotation axis and the direction of the central axis are in a nominally fixed angular relationship relative to one another and are parallel to within 5 degrees of one another.

The rotating chromatic range sensor configuration is operated to provide a first set of radial distance data acquired while rotating the radial distance sensing beam about the rotation axis at a first Z coordinate along the Z direction relative to the calibration object, the radial distance data referenced to a sensed rotational angle of the radial distance sensing beam about the rotation axis. The first set of radial distance data referenced to the sensed rotation angle is processed to determine the calibration data. The calibration data is configured to be usable to characterize or compensate radial distance measurement errors as a function of the sensed rotational angle of the radial distance sensing beam about the rotation axis.

In some implementations, a system is provided which includes a coordinate measurement machine (CMM), a chromatic range sensor (CRS) optical probe and a calibration object. The CMM includes light generating circuitry, wavelength detection circuitry, and CMM control circuitry. The CRS optical probe is configured to couple to the CMM and includes an optical pen having a confocal optical path including at least a confocal aperture and a chromatically dispersive optics portion. The optical pen is configured to direct a radial distance sensing beam along a radial direction relative to a rotation axis, rotate the radial distance sensing beam about the rotation axis, and focus different wavelengths at different distances along a measurement axis proximate to a workpiece surface to be measured. The calibration object is for providing calibration data for correcting misalignment errors of the CRS optical probe.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 13A to 13E illustrate example embodiments of a calibration object which takes the form of a plurality of nested precision metal tubes;

DETAILED DESCRIPTION

Figure 1:
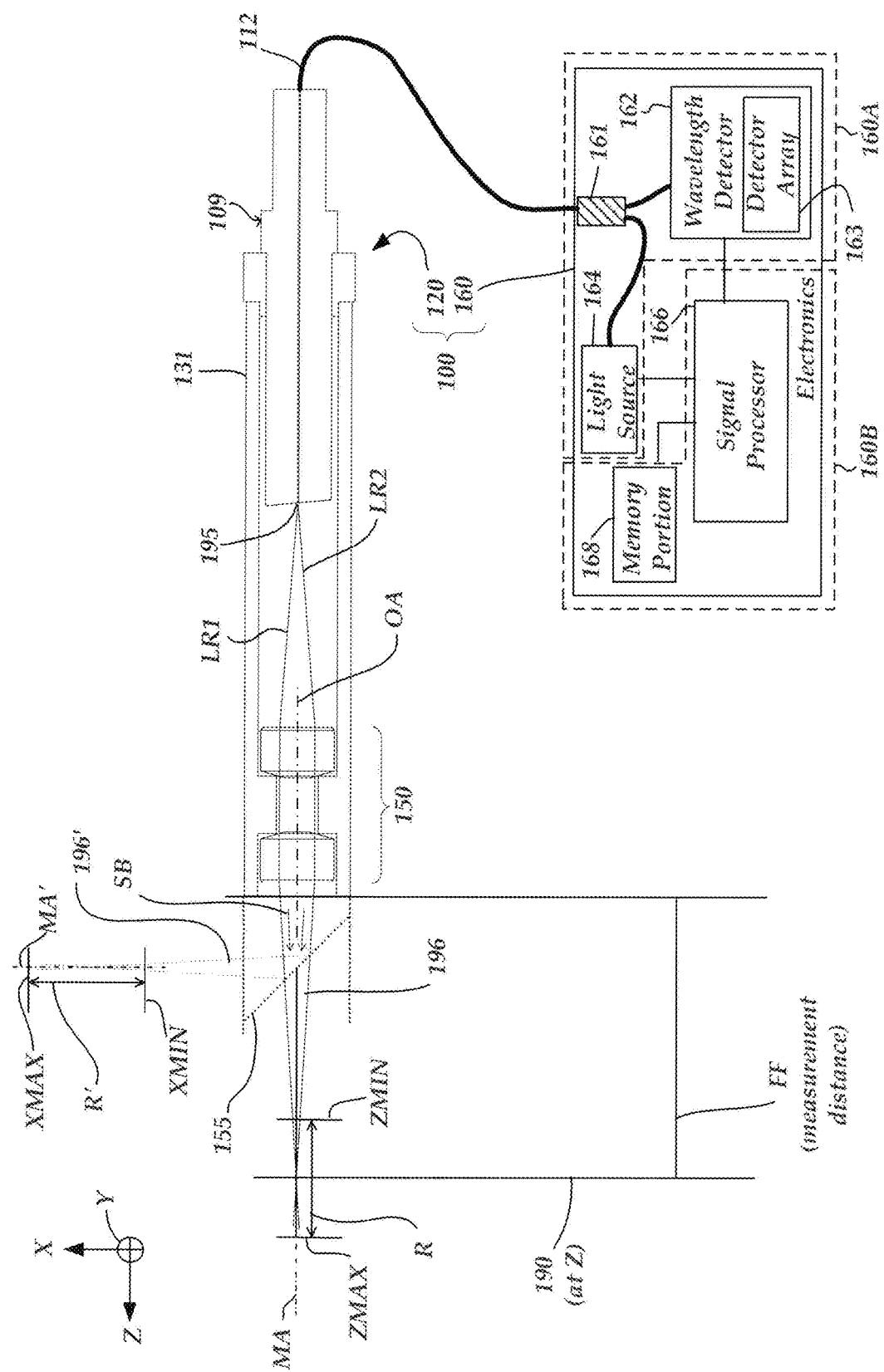
FIG. 1 is a block diagram of an exemplary chromatic range sensor (CRS) system including an optical pen.

FIG. 1 is a block diagram of an exemplary chromatic range sensor (CRS) system 100 of a first type based on operating principles that are desirable to employ in conjunction with a coordinate measurement machine. The CRS system 100 has certain similarities to systems described in U.S. Pat. Nos. 7,876,456 and 7,990,522 (the '456 and '522 patents, respectively), which are hereby incorporated herein by reference in their entireties. As shown in FIG. 1, the CRS system 100 includes an optical element 120 and an electronics portion 160. It will be appreciated that the CRS system 100 shown in FIG. 1 is a chromatic point sensor system which in some instances may measure a single measurement point at a time. The optical element 120 shown in FIG. 1 is an optical pen. However, in various embodiments alternative types of chromatic range systems, such as a chromatic line sensor, may be utilized.

The optical pen 120 includes a fiber optic connector 109, a housing 131 (e.g. an assembly tube), and an optics portion 150. The fiber optic connector 109 is attached to the end of the housing 131. In various implementations, the fiber optic connector 109 may be oriented at an angle relative to the housing 131. The fiber optic connector 109 receives an in/out optical fiber (not shown in detail) through a fiber optic cable 112 which encases it. The in/out optical fiber outputs source light through a fiber aperture 195, and receives reflected measurement signal light through the fiber aperture 195.

In operation, broadband (e.g. white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light forms a measurement beam 196 that includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

FIG. 1 also schematically illustrates an optional reflective element 155 in dashed outline. As described in more detail in U.S. Patent Publication No. 20120050723, which is hereby incorporated by reference in its entirety, a reflective element may be placed in the path of the source beam SB. In such an implementation, rather than the measurement axis MA being coaxial with the optical axis OA, the reflective element may direct the measurement beam 196' along a measurement axis MA' in a different direction (e.g. orthogonal to the optical axis) as needed in some measurement applications. Such an orthogonal orientation is utilized in the embodiments illustrated in other figures herein, as will be described in more detail below.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive optics portion (e.g. a grating) receives the reflected light through the optical fiber cable 112 and transmits the resulting spectral intensity profile to a detector array 163. The wavelength detector 162 may also include related signal processing (e.g. provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g. a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail in the incorporated references. Briefly, a sub-pixel-resolution distance indicating coordinate of the profile data (e.g. a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data. As will be described in more detail below, in a rotating system such as that described herein, calibration data (e.g., as stored in the memory portion 168 or otherwise) may also be utilized to indicate or adjust measurement distances based at least in part on a rotational angular orientation of the optical pen 120.

The optical pen 120 generally has a measurement range R that is bound by a minimum range distance ZMIN and a maximum range distance ZMAX. The measurement range R in some example instances of known optical pens may be approximately ¹⁄₁₀th of the nominal standoff or working distance from the end of the pen (e.g. in the range of tens of microns to a few millimeters). FIG. 1 schematically illustrates that if the reflector element 155 is used, the measurement range R' may be directed along a measurement axis MA' determined by the placement of the reflector element 155 (e.g. the x-axis). In such a case, the measurement range R' may be bound by minimum range distance XMIN and a maximum range distance XMAX.

It should be appreciated that in some implementations the electronics portion 160 may be located away from the optical pen 120. It has been known to mount an optical pen analogous to the optical pen 120 shown in FIG. 1 on a CMM using a customized bracket, and to route an optical fiber analogous to the optical fiber cable 112 along a makeshift path on the outside of CMM components to a remotely located electronics analogous to the electronics 160.

As disclosed in more detail below with respect to FIGS. 2, 3A and 3B, a group of components in a light source and wavelength detector portion 160A (e.g. including the wavelength detector 162 and light source 164) may be included inside a CRS optical probe assembly in some embodiments. A group of components in a measurement signal processing and control circuit 160B (e.g. including the signal processor 166 and memory portion 168) may be located remotely outside of the CRS optical probe assembly, if desired (e.g. to maintain low probe weight and compact probe size).

Figure 2:
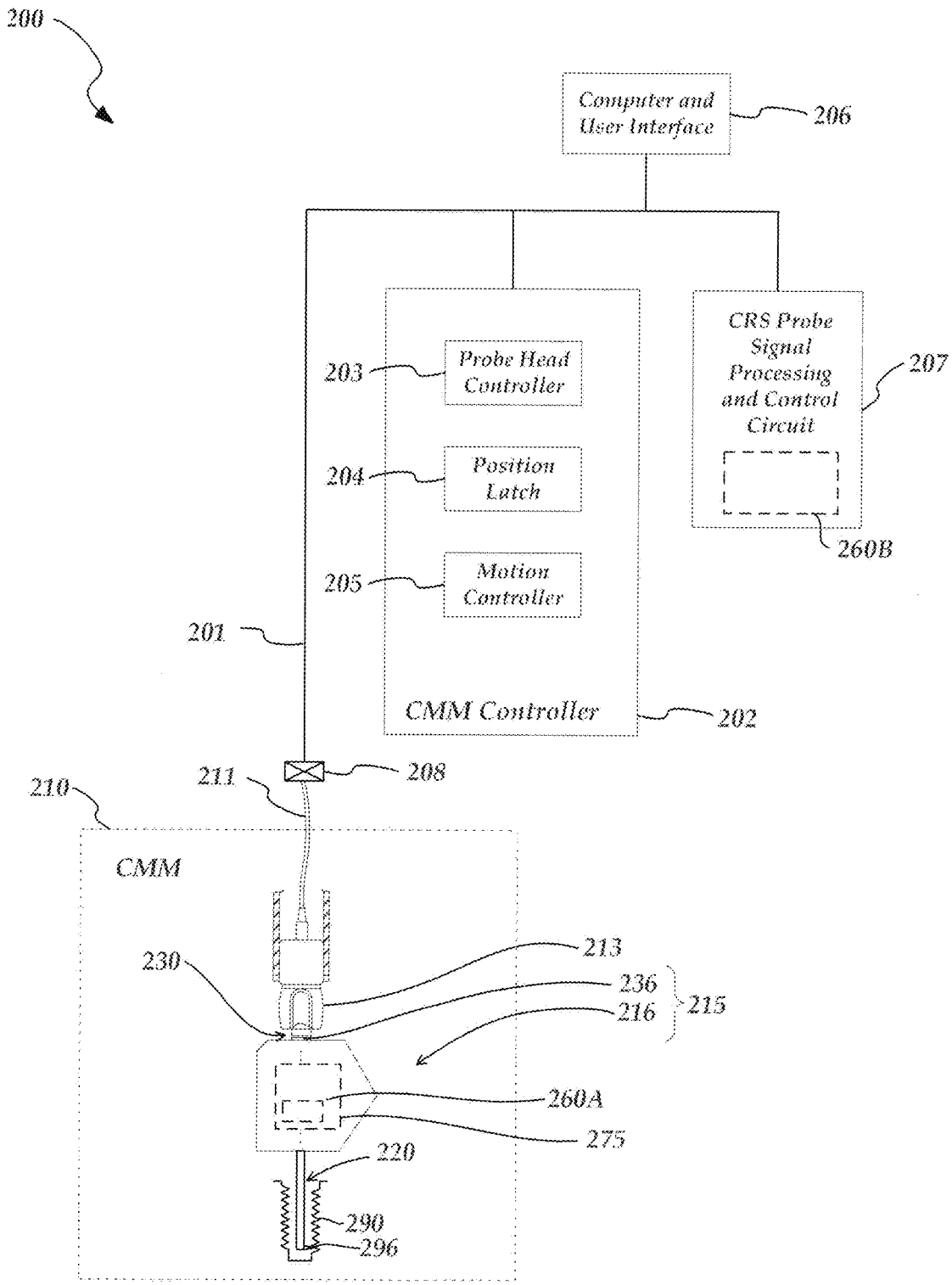
FIG. 2 is a block diagram of a coordinate measurement system including a coordinate measurement machine, a CRS optical probe including an optical pen, controllers and a user interface.

FIG. 2 is a diagram of a coordinate measurement system 200, and an automatically connectable and interchangeable CRS optical probe system 215. That is, the CRS optical probe system 215 may be automatically interchanged with other types of CMM probes. A CRS optical probe system may also be referred to simply as a CRS optical probe herein. In various drawings herein, unless otherwise indicated by description or context, reference numbers having similar suffixes (e.g. reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to being identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204 and a motion controller 205. The CRS optical probe 215 includes an auto exchange joint element 236, and is connected to the coordinate measurement machine 210 through a mating joint element in the probe autojoint connection 230 (also referred to as an auto exchange joint connection).

In various implementations, the coordinate measurement machine 210 may communicate with all of the other components through a data transfer line 201 (e.g. a bus), which is connected by a connector 208 (e.g. a "micro-D" type connector) to a probe head cable 211 which provides signals to and from the CRS optical probe 215. The coordinate measurement machine 210 is controlled by the coordinate measurement machine controller 202, while the CRS optical probe 215 exchanges data with, and is controlled by, the probe signal processing and control circuit 207 (e.g. in one embodiment, a probe signal processing and control circuit including measurement signal processing and control elements 260B, as outlined above with reference to the element 160B in FIG. 1). The user may control all of the components through the computer and user interface 206.

As outlined above, and described in more detail below with respect to FIGS. 3A and 3B, the CRS optical probe 215 includes a probe electronics 275 which includes a light source and wavelength detector portion 260A (e.g. in one embodiment, a light source and wavelength detector as outlined above with reference to the element 160A, in FIG. 1), and an optical pen 220, which directs a measurement beam 296 toward a measurement surface 290. In one specific example implementation, the measurement surface 290 may comprise an internal surface of a threaded hole. Such surfaces have been difficult or impossible to measure completely and reliably with known CMM probes (e.g. a touch probe). A CRS optical probe such as that disclosed herein is able to scan and measure such surfaces with improved completeness, accuracy and versatility.

As will be described in more detail below with respect to FIG. 5, in one embodiment, data related to the optical pen and/or interchangeable optics element (e.g. identification data, calibration data, compensation data, etc.) may be stored externally to the CRS optical probe 215 (e.g. in the probe signal processing and control circuit 207.) In alternative implementations, portions of such data may be stored or otherwise encoded within portions of the CRS optical probe 215.

Figure 3A:
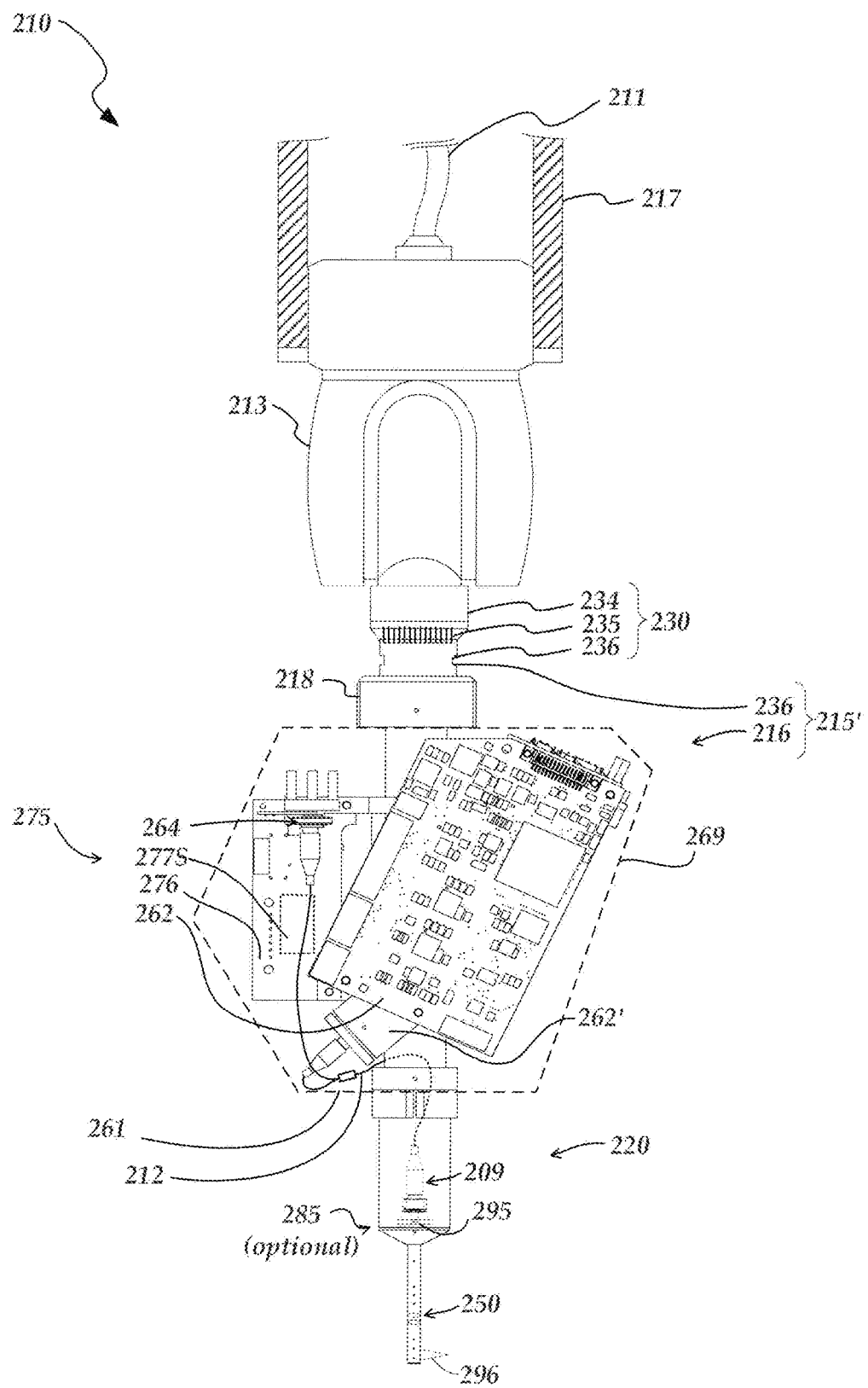
FIGS. 3A and 3B are diagrams illustrating the internal components of a first exemplary embodiment of the CRS optical probe of FIG. 2.
Figure 3B:
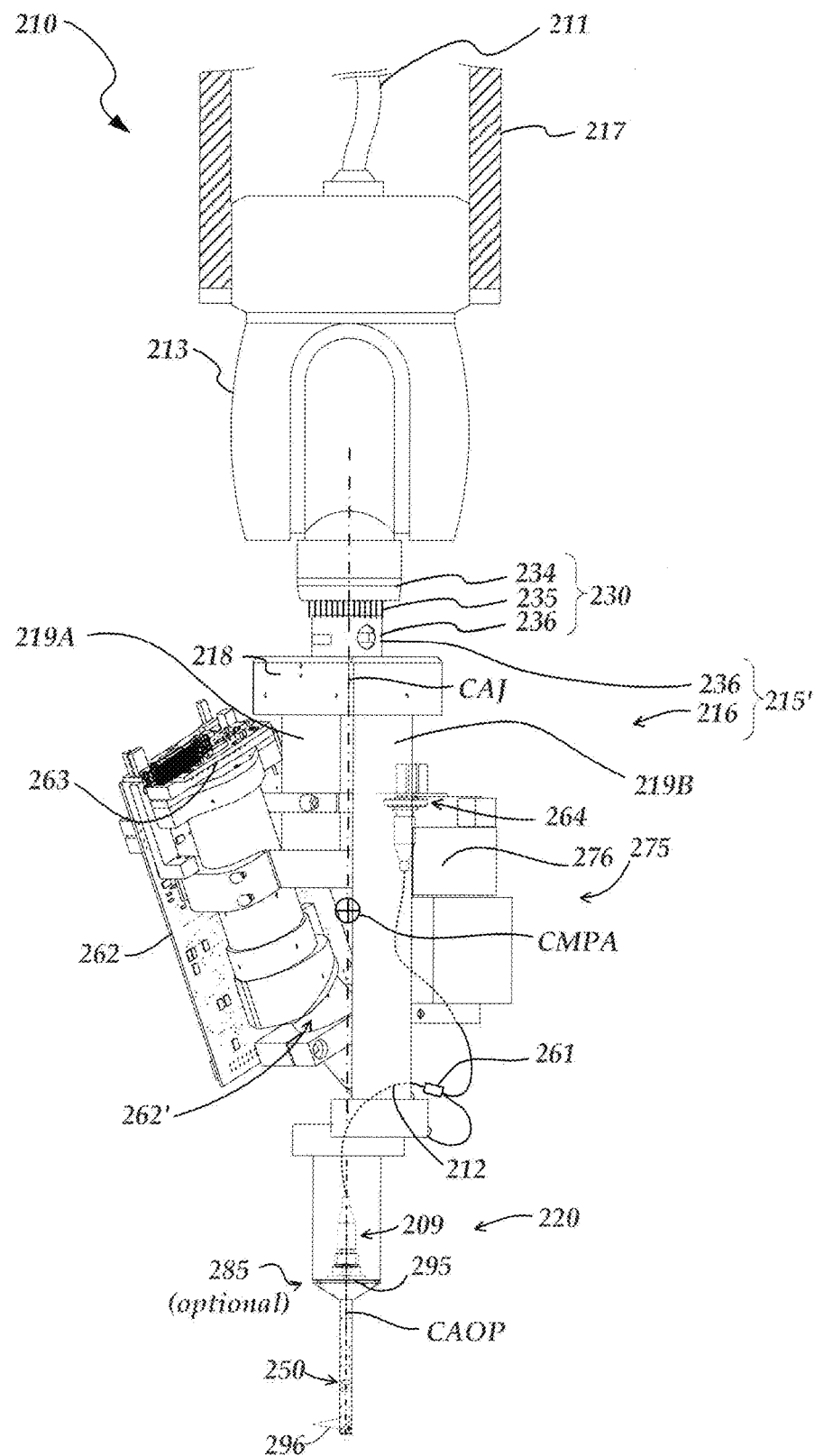

FIGS. 3A and 3B are diagrams schematically illustrating certain components of the coordinate measurement machine 210 and a CRS optical probe 215', which is similar to the CRS optical probe 215 of FIG. 2. FIG. 3A is a front view, and FIG. 3B is a view from a different angle of the coordinate measurement machine 210 and the CRS optical probe 215'. As shown in FIGS. 3A and 3B, the coordinate measurement machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230.

The probe head 213 in some embodiments rotates in 360 degrees in a horizontal plane and contains a type of U-joint. The probe autojoint connection 230 is an electro-mechanical connection that fastens the probe head 213 rigidly and mechanically to the CRS optical probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element (236) is mounted to the CRS optical probe 215'. In one embodiment, the probe autojoint connection 230 has mating electrical contacts or connections 235 so that when a probe is attached, the contacts automatically engage and make electrical connections.

The CRS optical probe 215' receives its power and control signals through the autojoint connection 230. The signals passed to the CRS optical probe 215' through the autojoint connection 230 are passed through connections 235. As shown in FIGS. 3A and 3B, the CRS optical probe 215' includes auto exchange joint element 236 and a probe assembly 216 that is mounted to the auto exchange joint element 236, for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members. In the embodiment shown in FIGS. 3A and 3B, the structural members extend from a base 218 that is attached to the auto exchange joint element 236. The optical pen 220 (analogous to the optical pen 120) may include a fiber optic connector 209, and a confocal optical path including an aperture 295 and chromatically dispersive optics portion 250, which outputs a measurement beam 296. In some embodiments, the optical pen 220 may include a repeatable fast exchange mount 285 which allows replacement of the chromatically dispersive optics portion 250, as described in greater detail below. The electrically powered light source 264 (e.g. a broad spectrum LED light source) may work in conjunction with known circuits (e.g. as found in commercial chromatic ranging systems) included in a probe power and signal control circuit portion 276 which is included in probe electronics 275, and which receives electrical power transmitted through the auto exchange joint element. In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below. In the embodiment shown in FIG. 3A, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics.

The light source 264 generates light originating in the CRS optical probe assembly, the light comprising an input spectral profile of wavelengths routed to the optical pen 220 through the fiber optic cable 212. The CRS wavelength detector 262 may comprise known circuits (e.g. as found in commercial chromatic ranging systems) that work in conjunction with a spectrometer arrangement 262' and detector array 263 comprising a plurality of pixels distributed along a measurement axis of the CRS wavelength detector, the plurality of pixels receiving respective wavelengths reflected into the confocal optical path from the target surface and providing output spectral profile data.

It will be appreciated that a configuration such as that outlined above which generates and processes the light used for measurement entirely within the CRS optical probe assembly allows the CRS optical probe assembly to be self-contained and automatically exchangeable. In various embodiments, such a CRS optical probe system does not require or include an optical fiber connection from the CRS optical probe assembly to an outside element through the auto joint connector, or along any other makeshift path in parallel with the auto joint connector. Stated another way, in various embodiments, such a CRS optical probe assembly does not connect to or include an optical fiber that extends outside of the CRS optical probe assembly.

In various embodiments, the CRS optical probe assembly is configured such that the optical pen is mounted at a distal end of the CRS optical probe assembly. In the embodiment shown in FIGS. 3A and 3B, the CRS optical probe assembly 215' includes the base portion 218, a wavelength detector mounting portion 219A coupled to the base portion 218, and an optical pen mounting portion 219B coupled to the base portion and carrying the optical pen without carrying the wavelength detector, which may isolate heat and mass-related deflection and vibration away from the optical pen. In some embodiments, one or both of the mounting portions 219A and 219B may comprise a hollow structural tube (e.g.

a carbon fiber tube) that extends away from the base portion and toward the distal end of the CRS optical probe assembly.

In one embodiment, the center of mass of the optical pen 220 is located proximate to an axis defined by the center of mass CMPA of the rest of the CRS optical probe 215' and the center axis CAJ of the probe autojoint connection 230. Such a configuration may provide for smoother operation of the probe head 213 as it is utilized to move the CRS optical probe 215' (e.g. avoiding unnecessary additional torque, vibration, deflection, etc.) In one implementation, the optical pen 220 may also be mounted relative to the probe autojoint connection 230 such that the central axis CAOP (e.g. a reference axis for measurements) of the optical pen 220 is coaxial with the central axis CAJ of the auto exchange joint 230. In such a configuration, when the CMM rotates the probe autojoint connection 230 around its axis, the optical pen 220 may also be rotated around its axis with no lateral movement of the measurement reference axis in a X-Y plane. Such a configuration may provide certain advantages (e.g. being mechanically more stable, simplifying the calculation of the location of the measurements taken with the optical pen 220 relative to the positioning by the CMM, etc.)

Figure 4A:
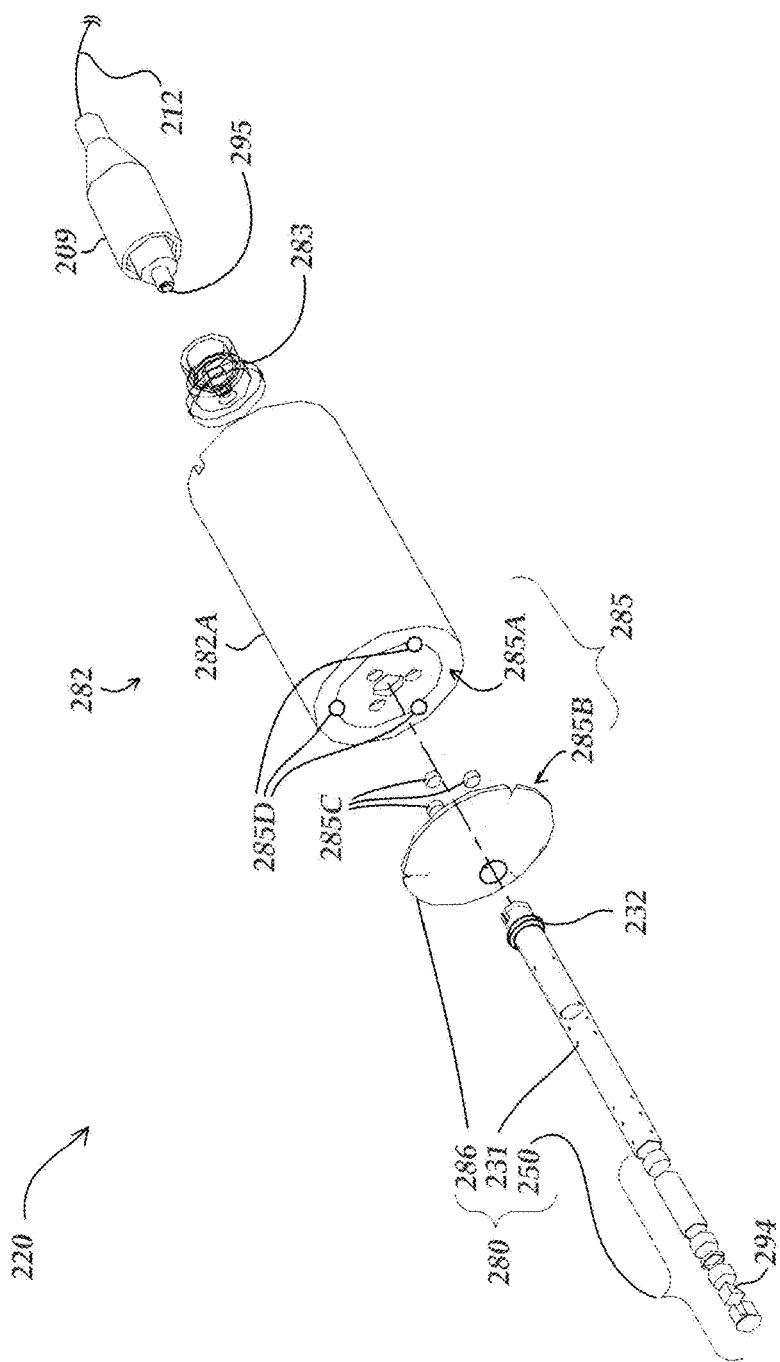
FIGS. 4A and 4B are diagrams illustrating the components of the optical pen including the repeatable fast exchange mount and the interchangeable optics element of FIGS. 3A and 3B.
Figure 4B:
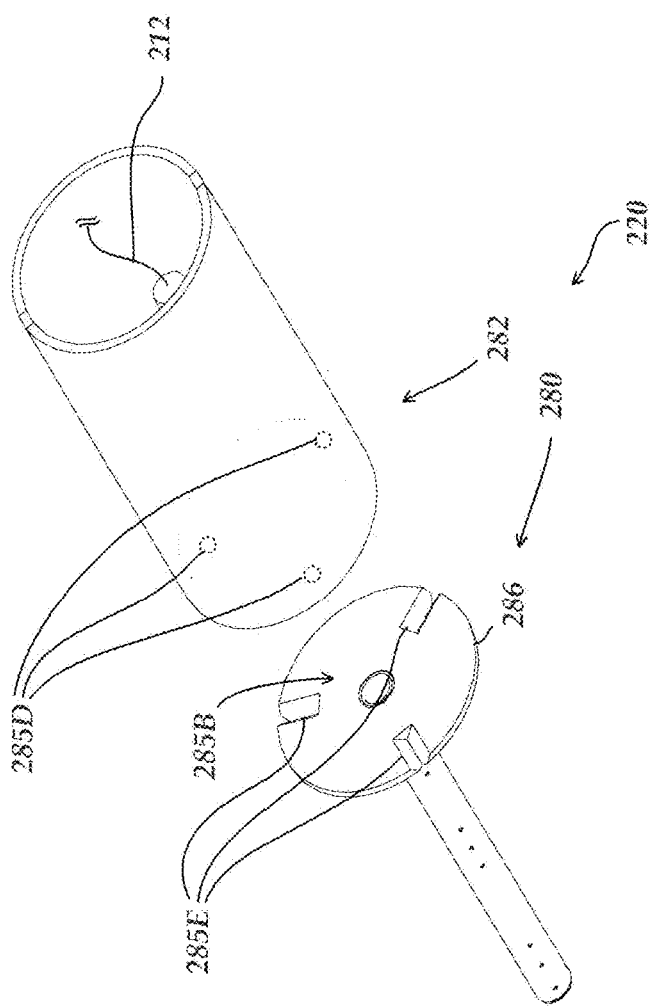

FIGS. 4A and 4B are diagrams illustrating components of the optical pen 220 of FIGS. 3A and 3B, for an embodiment that includes an exemplary repeatable fast exchange mount 285. In the embodiment shown in FIGS. 4A and 4B, the optical pen 220 includes a base member 282 and an interchangeable optics element 280. The interchangeable optics element 280 includes a front plate 286, tube 231, and chromatically dispersive optical portion 250. The base member 282 includes a base housing 282A which includes a surface which serves as a first mating half 285A of the repeatable fast exchange mount 285, and the front plate 286 has a corresponding surface which serves as a second mating half 285B of the repeatable fast exchange mount 285. In one embodiment, the second mating half 285B of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. With such a configuration, the second mating half 285B may be automatically connected to and separated from the first mating half 285A under program control (e.g. as controlled by the computer and user interface 206.) For example, in one embodiment the optical pen may include a collar 232 or the like, which may be guided under program control such that it is inserted between the arms of a mating fork included on a probe rack within the motion volume of a CMM. The CMM may then move the CRS optical probe 215' such that the arms of the fork bear on the collar 232 and force the mating halves of the repeatable fast exchange mount 285 apart, leaving the interchangeable optics element 280 hanging in the probe rack. The interchangeable optics element 280 may be mounted back to the base member 282 by the reverse of these operations. In addition, with such a configuration, in the event of a lateral collision with a workpiece, the interchangeable optics element 280 will separate from the base member 282, rather than being damaged.

In one embodiment, the repeatable fast exchange mount 285 may comprise three spheres or balls 285D which are fixed in the first mating half 285A in a first triangular pattern (e.g. an equilateral triangle), and a three radially oriented V-grooves 285E which are fixed in the second mating half 285B in a mating pattern. Such an embodiment of the repeatable fast exchange mount 285 allows the interchangeable optics element 280 to be mounted with the laterally oriented measurement beam 296 facing in any of three different orientations spaced 120 degrees apart. However, it will be appreciated that such an embodiment is exemplary only, and not limiting. Various other repeatable fast exchange mounting configurations may be used, provided that adequate mounting repeatability is provided, as is generally known in the art.

The interchangeable optics element 280 includes the chromatically dispersive optical portion 250 (e.g. analogous to the chromatically dispersive optical portion 150 described above with respect to FIG. 1.) In one embodiment, the base member 282 includes the end of an optical fiber 212 that is connected to the LED light source 264 and to the spectrometer arrangement 262' through a fiber connector 261. The end of optical fiber may be located proximate to a confocal aperture 295 that is fixed relative to the first mating half 285A of the repeatable fast exchange mount 285, which may generally surround the confocal aperture 295. In some embodiments, the end of the optical fiber provides the confocal aperture. In some embodiments, the confocal aperture 295 is provided by a thin aperture that is bonded in place proximate to or abutting the end of the optical fiber (e.g. on a holder or connector that holds the optical fiber). In the embodiment shown in FIG. 4A, the base member 282 includes an optical fiber end positioning arrangement 283 comprising an optical fiber holding element 283A (e.g. a fiber optic connector that mates with the connector 209, in this embodiment) and an optical fiber end positioning arrangement 283B that are fixed (e.g. bonded) in the base member 282 proximate to the first mating half 285A of the repeatable fast exchange mount 285.

In this embodiment, the optical fiber end positioning arrangement 283 may comprise an optical fiber holding element that holds the optical fiber (e.g. through the connector 209) and fixes the end of the optical fiber and the confocal aperture 295 relative to the first mating half 285A of the repeatable fast exchange mount 285. However, in other embodiments, the confocal aperture may be separately fixed to the base member 282 and the end of the optical fiber may be fixed proximate to that confocal aperture by a suitable optical fiber end positioning element, if desired, as described in greater detail below.

The interchangeable optics element 280 receives measurement light from, and returns measurement light to, the confocal aperture 295, and provides axial chromatic dispersion of the measurement light over a respective measuring range along a measuring axis. In one embodiment, the chromatically dispersive optical portion 250 may also include a reflective element 294, which directs the measurement beam laterally to the axis of the optical pen 220 (e.g. laterally relative to the axis of the tube 231).

Figure 5:
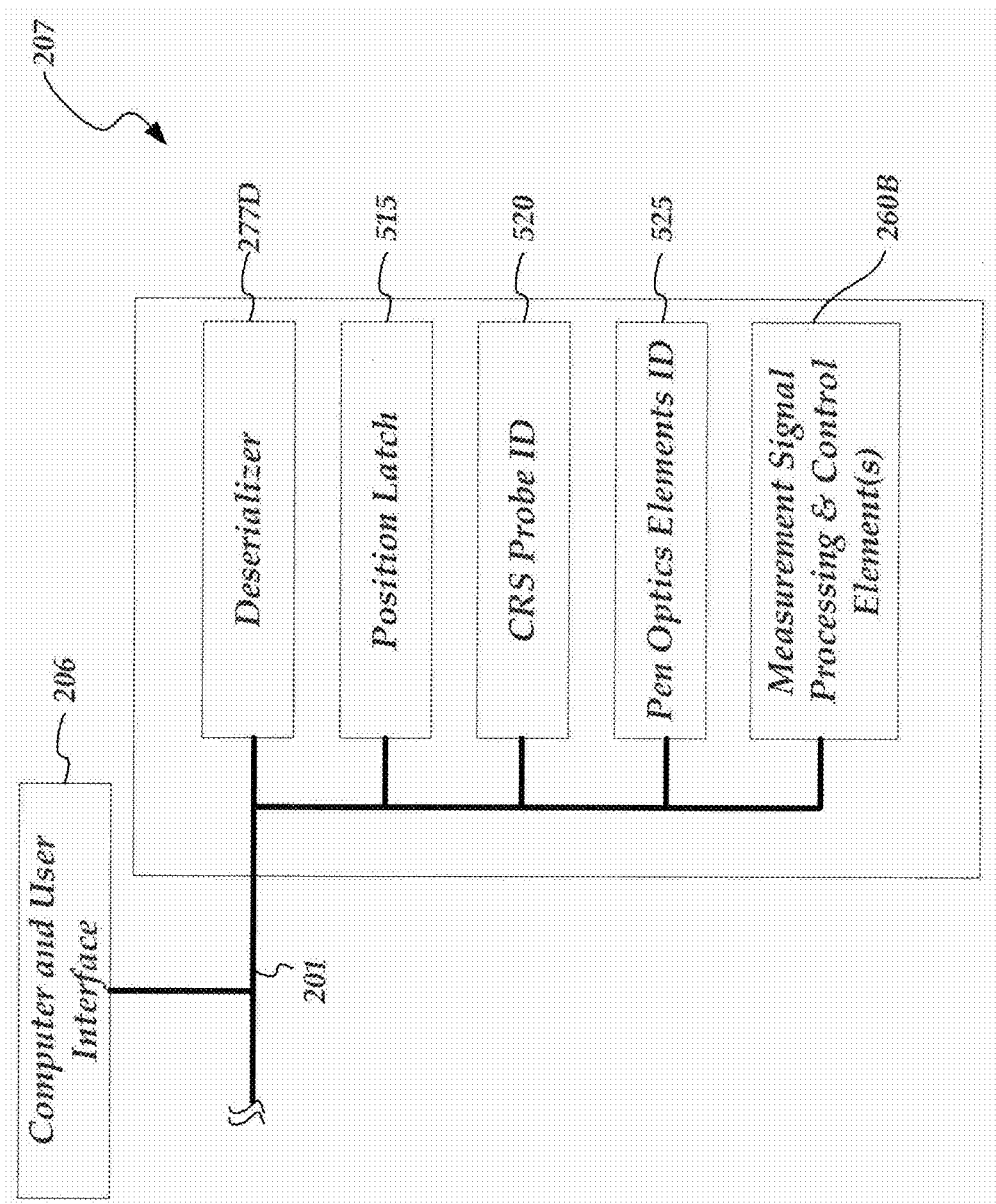
FIG. 5 is a block diagram illustrating the components of the probe controller of FIG. 2.

FIG. 5 is a block diagram of one embodiment of the computer and user interface 206 and the probe signal processing and control circuit 207 of FIG. 2. As shown in FIG. 5, the probe signal processing and control circuit 207 may include a deserializer 277D, a position latch 515, a CRS optical probe ID 520 and an optical pen ID 525. The components of the probe signal processing and control circuit 207 are coupled to one another and to the computer and user interface 206 by the data transfer line 201.

The deserializer 277D may work in conjunction with the serializer 277S shown in FIG. 3A, to allow various data signals to be serialized and communicated through the autojoint connection 230 using relatively few wires. The serializer 277S and a deserializer 277D are related to the utilization of certain low voltage differential signaling (LVDS) that may be used in some embodiments. Briefly, a synchronization signal is provided between a serializer and a deserializer, in order to ensure that they are synchronized. On the corresponding signal lines, clock signals are provided until the deserializer is finished, at which point the synchronization signal is switched, after which the relevant data signals are provided on the signal lines (as opposed to the previous clock signals.)

The position latch 515 relates to an XYZ latch signal. Briefly, an XYZ latch signal is provided for synchronizing the measurement positioning of the CRS optical probe with the measurement positioning of the coordinate measurement machine controller 202. In one embodiment, the position latch 515 communicates with the position latch 204 in the coordinate measurement machine controller 202 in order to ensure that the coordinates of the coordinate measurement machine 210 are properly synchronized. In other words, the position latch 515 and the position latch 204 combine to ensure the accuracy of the overall derived measurements, such that the CMM machine coordinates (which reflect the position of the CRS optical probe during a particular measurement) are properly combined with the CRS optical probe measurements (which are relative to the CRS optical probe position).

The CRS optical probe ID 520 is utilized for determining the identification of the CRS optical probe 215' (e.g. by reading and processing an identification signal derived from an identifying element included in the CRS optical probe 215'), and the optics elements ID 525 is utilized for determining the identification of the interchangeable optics element 280 (e.g. by reading and processing an identification signal derived from an identifying element included in the interchangeable optics element 280). The proper identification of the CRS optical probe 215' and the interchangeable optics element 280 allow proper configuration and calibration data to be utilized in order to ensure accurate operations and resulting measurements from the CRS optical probe 215' and interchangeable optics element 280.

Figure 6:
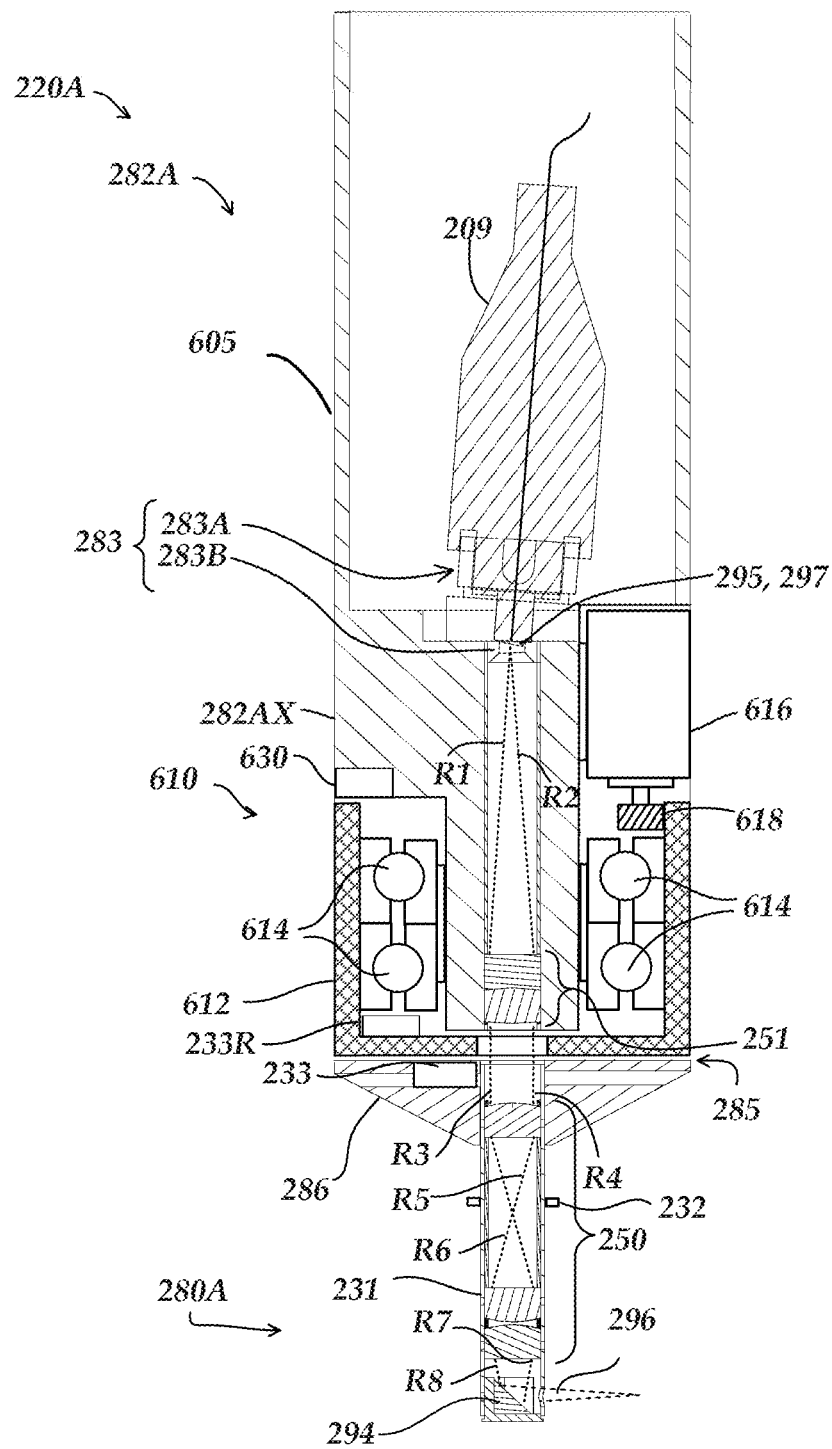
FIG. 6 is a diagram illustrating the components of an exemplary embodiment of an optical pen which includes a rotary portion for rotating an interchangeable optics element, and an encoder for measuring and reporting position information.
Figure 6:
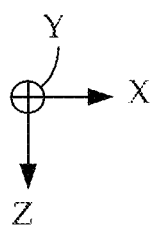

FIG. 6 is a diagram illustrating the components of an exemplary embodiment of an optical pen 220A which includes a non-rotating or fixed portion 605, a rotary element 610 for rotating an interchangeable optics element 280A and the direction of the measurement beam 296, and an encoder 630 for measuring and reporting position information, such as an azimuth rotation angle of the optical pen and position information with respect to the Z axis, such as position information related to a position of a calibration object, as discussed in more detail with respect to FIGS. 7A to 13E. As shown in FIG. 6, the base member 282A is configured to include components of the non-rotating portion 605, the rotary element 610 and the encoder 630.

Some exemplary "bounding" confocal rays (or ray segments) are illustrated in FIG. 6. In particular, rays R1 and R2 are shown between a transfer lens 251 and the aperture 295, and rays R3 and R4 are shown between the transfer lens 251 and the chromatically dispersive optical portion 250. The transfer lens 251 may be a collimating or nearly collimating lens in some embodiments, and the rays R3 and R4 are shown to be approximately parallel or approximately collimated which may provide advantages in certain implementations. Rays R5 and R6 are shown within the chromatically dispersive optical portion 250, and emerge as rays R7 and R8 in the measurement beam 296. It will be appreciated that the operational position 297 of the confocal aperture is proximate to or at the best focus position of the lens system of the optical pen 220, and in particular, the focal position of the transfer lens 251, in this particular embodiment. The transfer lens 251 may be located within an extended section 282AX of the base member 282A.

As shown in FIG. 6, the rotary element 610 includes a rotating portion 612, which in this particular embodiment includes a surface for providing a first mating half of the repeatable fast exchange mount 285. The first mating half is coupled to the second mating half of the fast exchange mount 285 which is located on the front plate 286, in a similar configuration to that described above with respect to the FIGS. 4A and 4B. The rotary element 610 also includes bearings 614 which allow the rotating portion 612 to rotate, as well as a motor 616 and gears 618 for driving the rotation. Alternative configurations may also be utilized for the motor and rotation actuation (e.g., a motorized sleeve configuration, etc.). The rotation may produce smaller errors/effects when the transfer lens 251 is located in the base member 282A, due to the fact that the optical transmission of the broad collimated beam indicated by the parallel rays R3 and R4 passing through the rotation joint is less sensitive to changing alignment.

The encoder 630 senses position information indicative of positions of the components of the optical pen 220A (e.g., rotatory position information and position information with respect to the Z axis) and reports the position information, for example, via one or more cables (see probe head cable 211 of FIG. 2).

In one embodiment, the interchangeable optics element 280A may include an ID element 233 (mounted to the front plate 286, for example). A corresponding reader element 233R may be located in the optical pen base member 282A. The ID element 233 may be encoded with particular identification information for the interchangeable optics element 280. The ID element 233 may in one embodiment comprise a radio frequency identification device (an RFID element), which may be a passive RFID element. The reader element 233R (e.g., an RFID reader element) is located in close enough proximity to be able to read the data from the ID element 233. In some embodiments, if the reader element 233R is not located adjacent to the ID element 233, a hole may be provided in the base member 282A so that the material of the base member does not obstruct the exchange of signals between the ID element 233 and the reader element 233R (e.g., radio signals, optical signals, an optical image, etc.). In some embodiments, the ID element 233 may comprise an identifying mark (e.g., a simple bar code) or color(s) and the reader element 233R may comprise a photodetector that provides a signal corresponding to the identifying mark or color(s). In some embodiments, the ID element 233 may comprise a passive resonant circuit having an identifying frequency and the reader element 233R may comprise an exciter/detector that provides a signal in response to the identifying frequency. The reader element 233R reports identification information based on the response signal, for example, via one or more cables (see probe head cable 211 of FIG. 2).

For ease of illustration, the rotary element 610 and the encoder 630 are shown in the form of functional blocks. It will be appreciated that the arrangements of the rotatory element 610, and the encoding element 630 are exemplary only, and not limiting. Various configurations may be altered to include similar components for rotating and extending the interchangeable optics elements, and reporting position information, with minor adaptations that will be apparent based on this disclosure.

In some embodiments, for calibration and accuracy purposes, the optical pen may be characterized by calibration data or information that includes or is based on radial distance data corresponding to, for example, a plurality of rotary positions of the interchangeable optics element, various focal and measurement distances associated with the optical pen 220A, the interchangeable optics element 280 and the chromatically dispersive optical portion 250, the fast exchange mount 285, etc. Such calibration data or information may compensate for various misalignments that may be a function of the rotation position, position with respect to the Z axis, and chromatic range sensor (CRS) measurement distances, and other errors (e.g., rotary encoder errors, z stage errors, etc.), as discussed in more detail below.

Figure 7A:
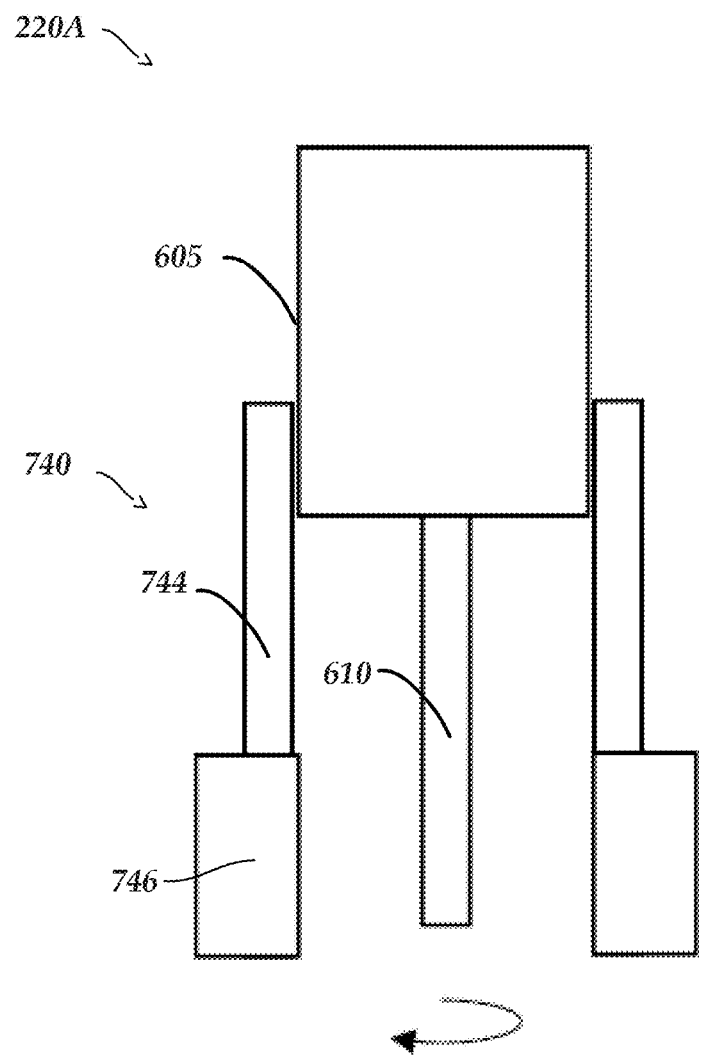
FIGS. 7A to 7C are cross-sectional diagrams illustrating exemplary calibration components of the optical pen of FIG. 6.
Figure 7B:
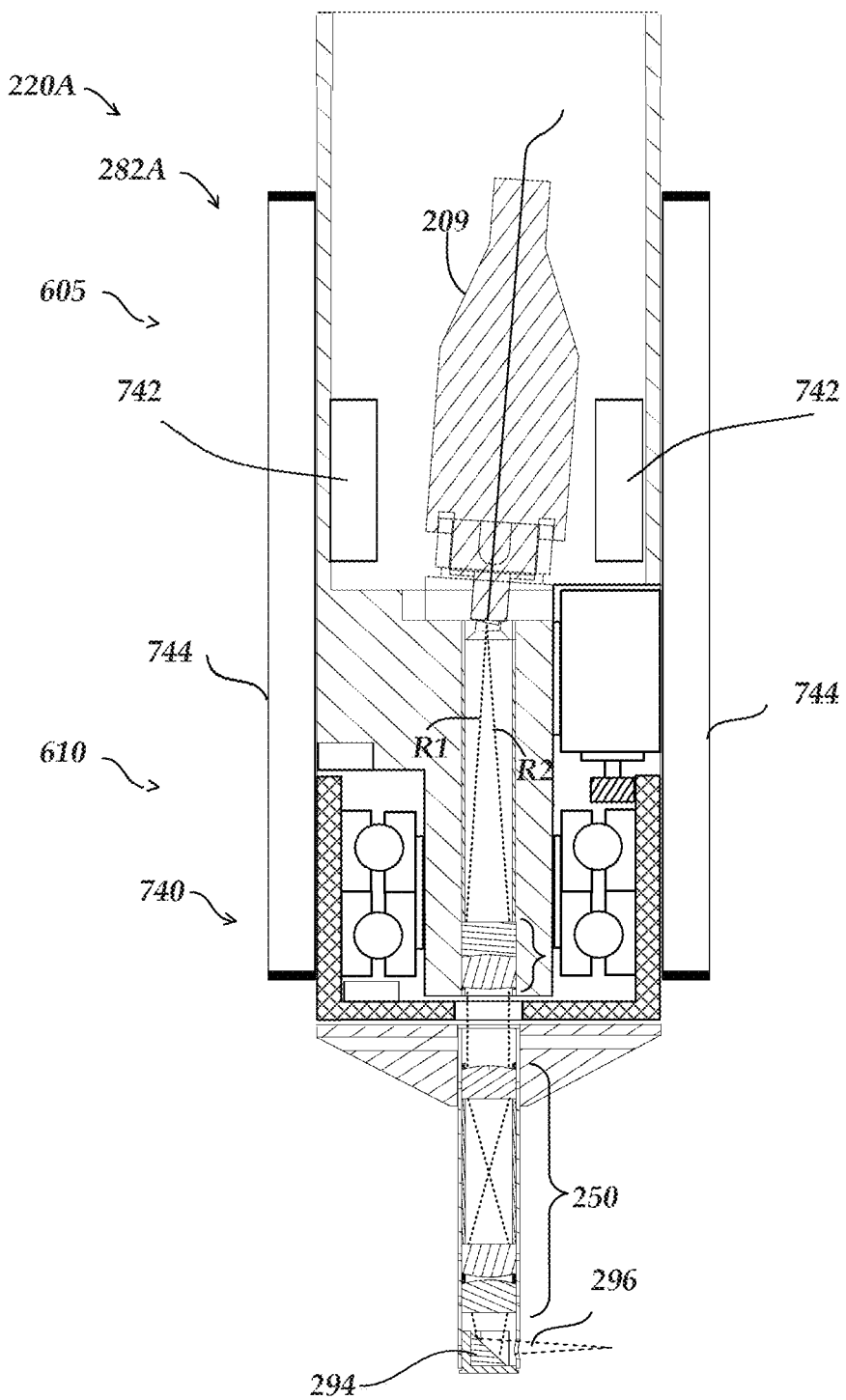
Figure 7C:
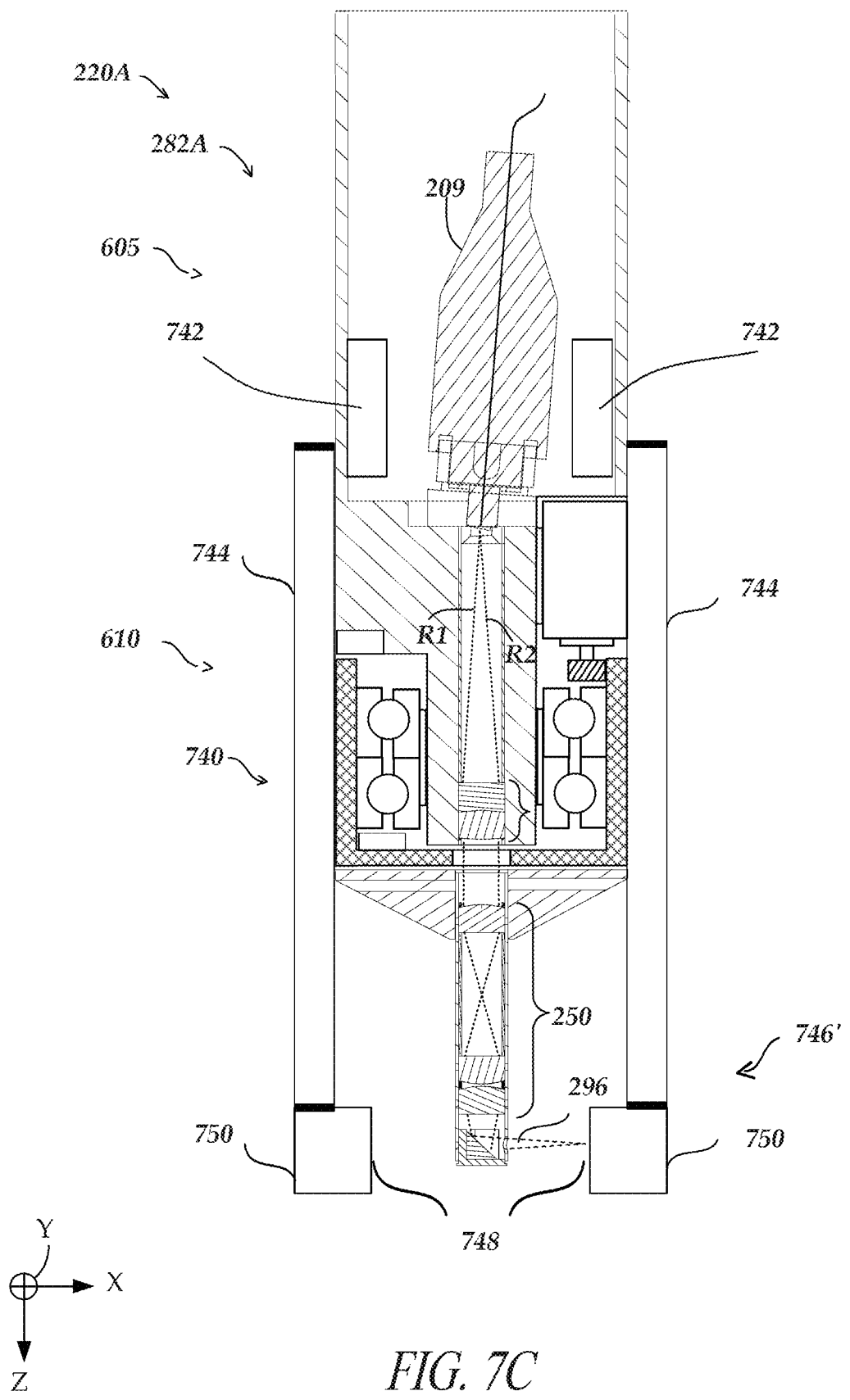

FIGS. 7A to 7C are diagrams illustrating exemplary calibration components 740 of the optical pen 220A of FIG. 6, which may be employed to obtain radial distance and other data used to calibrate the optical pen 220A. FIG. 7A is a conception diagram to provide an overview of the structure of an optical pen including calibration components, while FIGS. 7B and 7C provide more detailed illustrations of example embodiments. As illustrated in FIG. 7A, an optical pen 220A has a non-rotating or fixed portion 605 and a rotating portion 610. The calibration components 740 include a calibration gauge extension 744, movably attached to the non-rotating portion 605 of the optical pen 220A, and a calibration gauge or object 746. The calibration gauge 746 as illustrated is held in position relative to the rotating portion 610 of the optical pen 220A by calibration gauge extension 744. As the rotating element 610 rotates about the central axis of the optical pen 220A (the reference axis for the taking of measurements), measurements of the calibration object are taken (e.g., utilizing a measurement beam 296 as illustrated in FIG. 7C) to obtain radial distance measurements used to calibrate the optical pen 220A.

The calibration gauge extension 744 may use various holding force arrangements to hold a calibration object 746 in position relative to the rotating chromatic range sensor configuration of the optical pen 220A. For example, mechanisms similar to those discussed above with respect to the repeated fast exchange mount 285 may be employed. With such a configuration, the calibration object 746 may be automatically connected to, positioned, and separated from the calibration gauge extension 744 under program control (e.g. as controlled by the computer and user interface 206.)

As shown in FIGS. 7B and 7C, the calibration components 740 also include an extension actuator 742, which may include bearings, motors and gears (while these are not shown for ease of illustration, the bearings 614, motor 616 and gears 618 are analogous components of the rotary element 610 of FIG. 6) to facilitate positioning of the calibration gauge extension 744 between a storage position (as shown in FIG. 7B) and an extended calibration position (as shown in FIGS. 7A and 7C). FIG. 7B illustrates an example configuration in which the calibration gauge extension 744 is in the storage position, and is not currently coupled to a calibration object 746'. During calibration operations employing a calibration gauge or object 746', the calibration gauge extension 744 may be moved into the extended calibration position. Otherwise, the calibration gauge extension 744 may be stored in the storage position, so as not to interfere with other measurements taken using the optical pen 220A (e.g., measurements of the internal surfaces of a threaded hole, as discussed above with reference to FIG. 2). As noted above, in one implementation, when the calibration gauge extension 744 is moved to the extended calibration position, it may be coupled to a calibration object 746', as illustrated in FIG. 7C.

In some embodiments, the optical pen 220A and calibration object 746' are configured such that the calibration object 746' may be retained on the optical pen. For example, the calibration object 746' may be retained on the calibration gauge extension in a retracted position during a retracted time period, such that the calibration gauge extension 744 and the calibration object 746' do not obstruct or interfere with the radial distance sensing beam (i.e., the measurement beam 296) during normal measurement operations during the retracted time period. At a calibration time period, the calibration object 746' may be moved and retained on the calibration gauge extension in a calibration position.

In some embodiments, the calibration gauge extension 744 may be positioned by the extension actuator 742 in one of a plurality of extended calibration positions, to facilitate gathering calibration radial distance at different CRS measurement distances or focal lengths. In such circumstances, the encoder may report Z axis position information related to the position of the calibration object with respect to the optical pen 220A. In a manner similar to that discussed above with respect to the interchangeable optics element 280A, the calibration object 746' may include an ID element, and the calibration gauge extension 744 may include a corresponding reader element.

Alternative configurations may also be utilized for the extension actuator 742 (e.g., a motorized sleeve configuration, etc.). In some embodiments, the calibration gauge extension 744 arranges a calibration gauge or object 746' in a constrained relationship relative to the rotating chromatic range sensor configuration of the optical pen 220A, as discussed in more detail below.

As illustrated in FIG. 7C, a calibration gauge or object 746' comprises a ring gauge having an inside surface 748 and an outside surface 750. Other calibration objects may be employed, and various materials (e.g., metals, glass, etc.) may be employed in a calibration object. In an embodiment, one or more of the inside surface 748 and the outside surface 750 may contain printed markings or patterned surfaces (e.g., see FIGS. 9A-9D) or various combinations thereof, which, when scanned by the measurement beam 296, provide calibration data that may be used to generate calibration information related to the optical pen 220A.

Figure 8A:
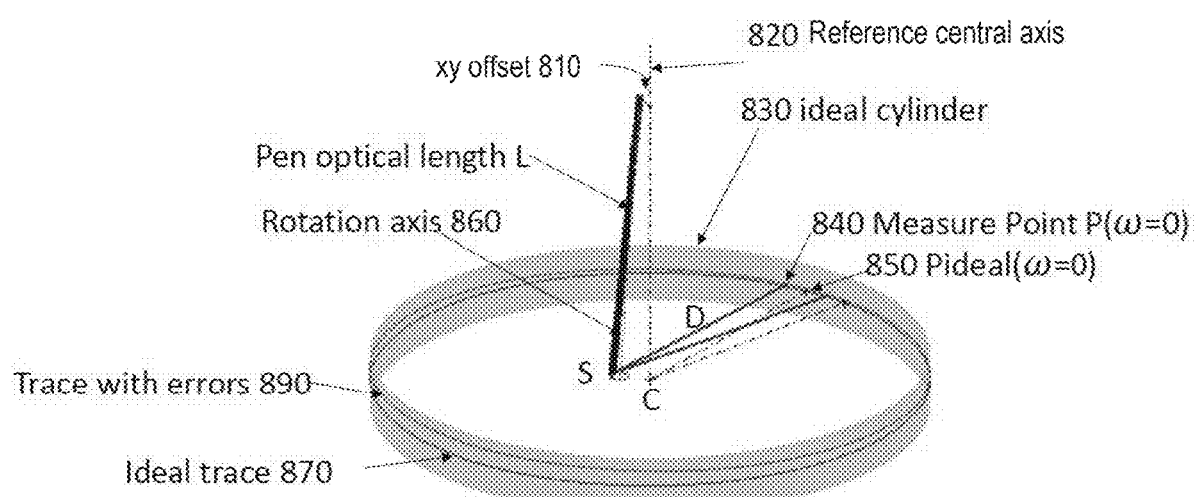
FIGS. 8A to 8C are conceptual diagrams illustrating example misalignments that may result in measurement errors when using a rotating optical pen to take measurements, and parameters which may be taken into consideration to compensate for such errors.
Figure 8B:
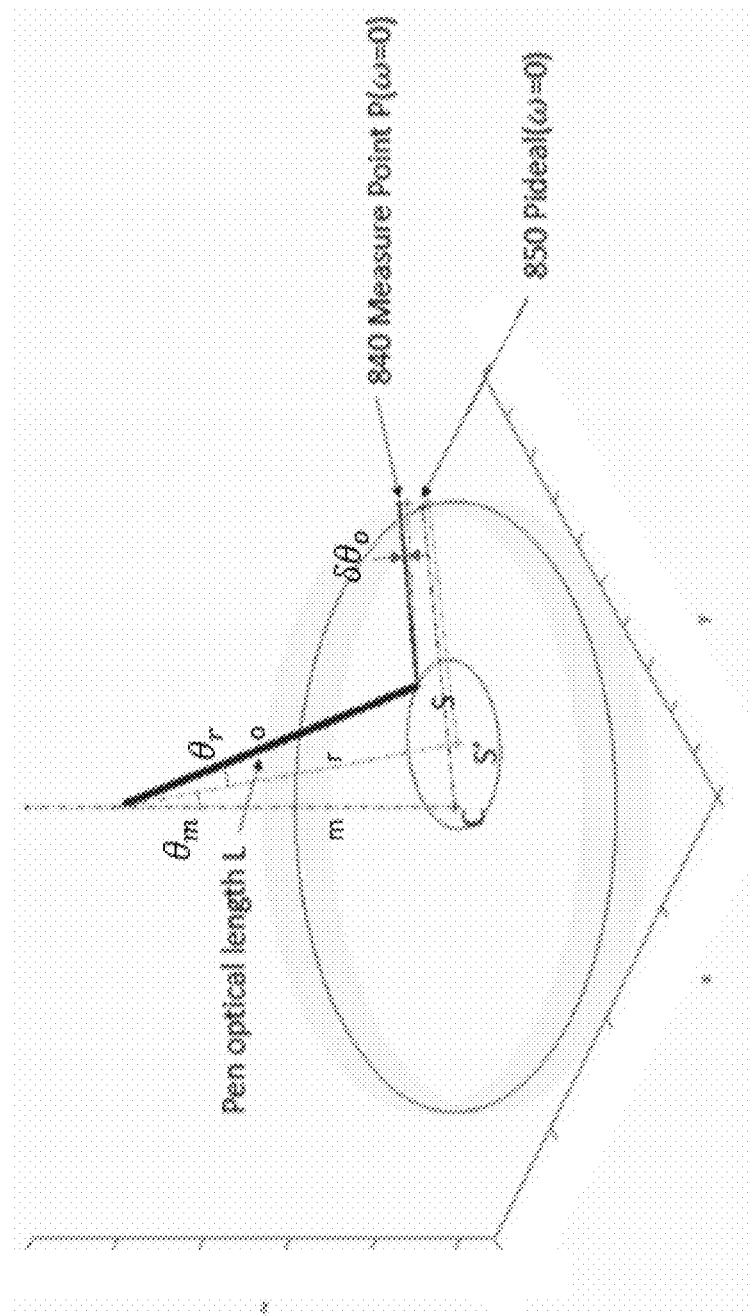
Figure 8C:
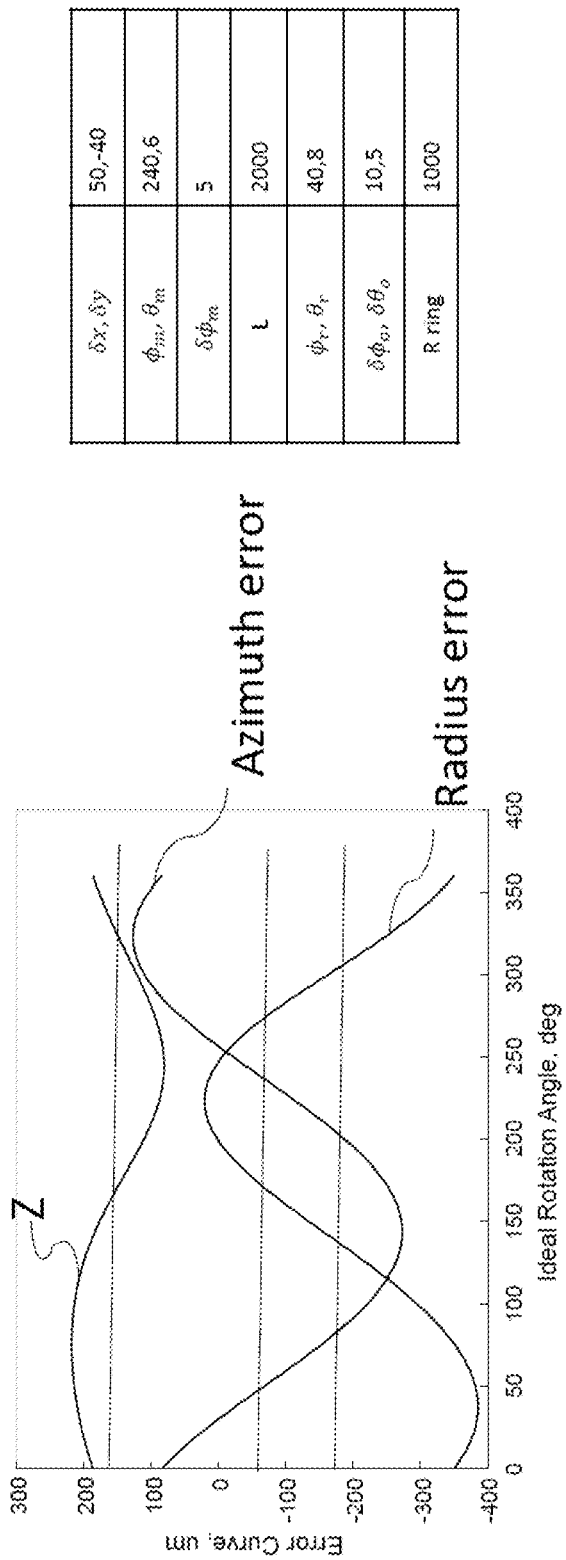

FIGS. 8A to 8C are conceptual diagrams illustrating in an exaggerated manner example misalignments that may result in measurement errors when using an optical pen to take measurements, and parameters which may be taken into consideration to compensate for such errors. As shown in FIG. 8A, in an ideal case an optical pen (see optical pen 220A of FIG. 6) has a reference central axis 820. When taking measurements of a surface of an ideal cylinder 830, the reference central axis 820 is aligned with an ideal center C of the ideal cylinder 830, and an incidence angle of the measurement beam (see measurement beam 296 of FIG. 7C) is an ideal constant with respect to the normal of the surface of the ideal cylinder 830. Ideal measurements would indicate distances from the ideal center C to ideal points along an ideal trace 870 of the ideal cylinder 830. Example ideal points along an ideal trace 870 are illustrated in FIGS. 8A and 8B, including an ideal point Pideal 850 at a rotational angle ω=0.

Misalignments of the optical pen or other components, however, may introduce measurement errors (e.g., as may be caused by various factors, such as misalignments of the fast exchange mount 285, etc.). For example, the optical axis of an optical pen may have an xy offset 810 from a reference central axis 820, and the rotational axis 860 of the optical pen along the optical pen length L may be misaligned with respect to the reference central axis 820 of the optical pen 220A. In addition, the reflective element 294 (see FIGS. 2 and 7B) may be misaligned from the optical axis of the optical pen. As a result, measurements taken with respect to measurement points may be taken from position S which orbits around a non-ideal center S', as illustrated in more detail in FIG. 8B. These, along with other possible misalignments, as illustrated in more detail in FIG. 8B, result in the measurement points being on a non-ideal trace, or a trace with errors 890. Example measurement points having associated misalignment errors are shown in FIGS. 8A and 8B, including a measurement point 840 at a rotational angle ω=0. In order to better illustrate certain aspects, the examples in the provided illustrations include certain exaggerated geometries (e.g., the Z axis has been compressed to better illustrate the potential misalignments and errors, etc.)

FIG. 8B illustrates additional details of example misalignments that can cause harmonic errors. Here, a reference central axis m (i.e., a mounting axis) corresponds to the reference central axis 820 of FIG. 8A. A rotation axis r corresponds to the rotation axis 860 of FIG. 8A. An optical axis o is illustrated as lying collinear with the pen optical axis along pen optical length L. The axis designations m, r and o are used in subscripts for various misalignment parameters, some of which are illustrated in FIG. 8B. The mounting axis misalignment angle $\theta_m$ gives the misalignment angle of the mounting axis m relative to the rotational axis r occurring within a plane containing the rotational axis and oriented at a mounting axis misalignment azimuth orientation angle $\phi_m$ (not shown in the illustration). The rotational axis misalignment angle $\theta_r$ gives the misalignment angle of the optical axis o relative to the rotational axis r occurring within a plane containing the rotational axis and oriented at an azimuth misalignment orientation angle $\phi_r$ (not shown in the illustration). The final measurement beam leaving the pen can also have pointing errors designated by output normal elevation (nominally vertical direction) angle error $\delta\theta_o$ and output normal azimuth (nominally horizontal direction) axis error $\delta\phi_o$ (not shown).

FIG. 8C illustrates, using the same exaggerated geometries shown in FIG. 8B, an example of first harmonic errors that may be introduced by various misalignments of the optical pen. For this example, as tabulated, the optical pen has an X axis offset δx of 50 μm, a Y axis offset δy of −40 μm, which make up the x and y components of xy offset 810 in FIG. 8A. The other tabulated parameters are defined in the description of FIG. 8B above and have the example (exaggerated) values for a mounting axis misalignment angle $\theta_m$ of 6°, for a mounting axis misalignment azimuth orientation angle $\phi_m$ of 240 μm, a mounting axis clocking error of $\delta\varphi_m$ (not shown) of 5°, an ideal optical pen length L of 2000 μm (shortened to exaggerate errors in FIG. 8B), a rotational axis misalignment angle $\theta_r$ of 8°, a rotational axis misalignment orientation angle $\phi_r$ of 40°, an output normal azimuth axis error $\delta\phi_o$ of 10°, an output normal elevation angle error $\delta\theta_o$ of 5°, and an ideal calibration measurement distance of 1000 μm. To a degree, the azimuth related errors (symbol $\phi$) are coupled to azimuth offset errors and phase of the harmonic errors, and the axis misalignments and elevation angle errors (symbol $\theta$) are coupled to radius and Z offset and harmonic amplitude errors. As illustrated, the radius error is primarily a first harmonic that as illustrated oscillates around a radius offset error of approximately −180. The Z error is primarily a first harmonic error that oscillates around a constant Z error offset, which as illustrated is an offset constant of approximately 180 μm. The azimuth error is primarily a first harmonic that as illustrated oscillates around an azimuth offset constant of approximately −50 μm. All three curves may also have a small amount of higher order harmonic content. It will be appreciated that in this example various aspects have been exaggerated in order to better illustrate the potential misalignments and resulting errors. In certain implementations, actual misalignments may be on the order of 0.1 to 1 degree, and actual errors (other than from xy offset) may be on the order of single digit micrometers or smaller.

As discussed in more detail elsewhere herein, radial distance measurements taken of a calibration object at given rotational angle ω and optionally Z may be used to generate calibration data. The calibration data may in turn be used to adjust measurement data (e.g., radial distance data) obtained when an optical pen of a coordinate measurement machine is used to take measurements of a workpiece. Calibration data in addition to radial distance data generated using a calibration object may be employed as part of or to generate calibration information. For example, measurements taken using an interferometer to determine chromatic range sensor distances associated with an optical pen (e.g., measurement distances at various light wave frequencies) or with the calibration object, may be employed in some embodiments. In another example, Z axis information related to a position of a calibration object with respect to an optical pen may be employed in some embodiments.

Figure 9A:
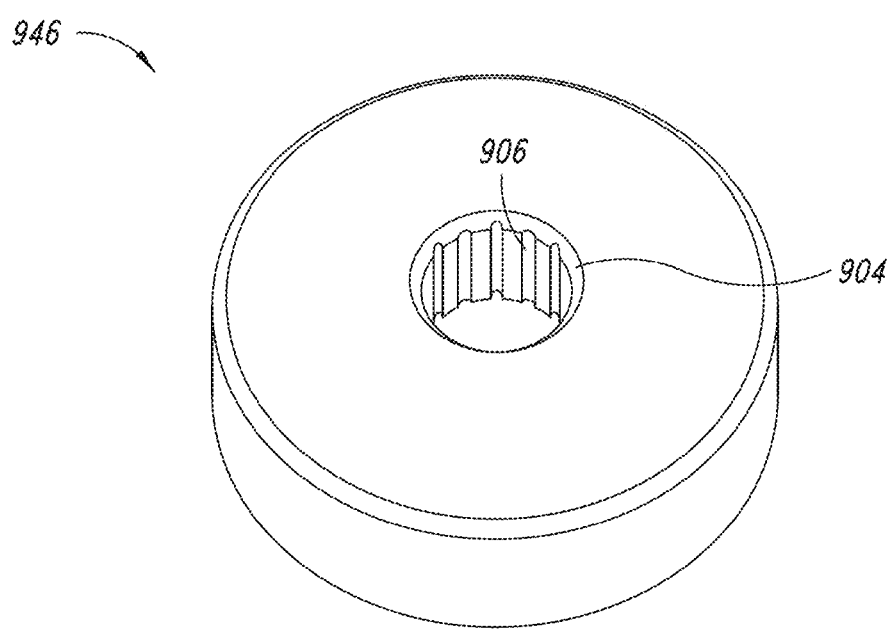
FIGS. 9A to 9D illustrate an example embodiment of a calibration object which takes a form of a ring gauge.
Figure 9B:
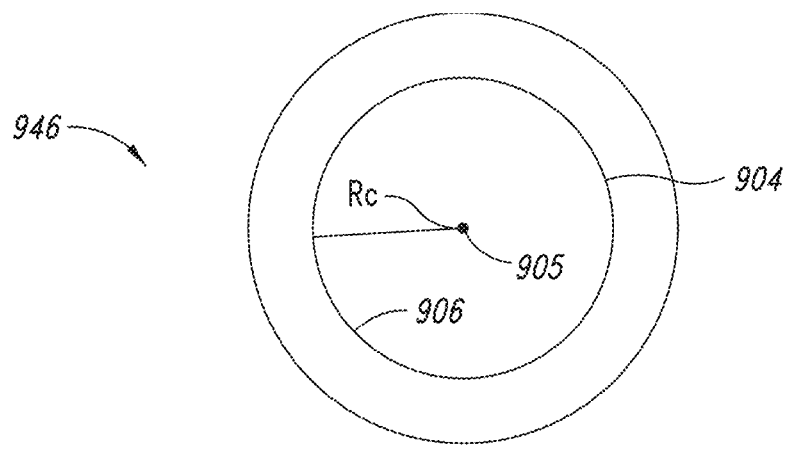

FIG. 9A to 9D illustrate a first embodiment of a calibration object 946 in the form of a cylindrical ring gauge. FIG. 9A is a perspective diagram and FIG. 9B is a cross-sectional diagram of a cylindrical ring gauge 946. The cylindrical ring gauge 946 has an inner surface 904 which has known features having known positional relationships with each other, such as a printed or textured pattern 906. The inner surface 904 is a nominally cylindrical calibration surface having a central axis 905 that extends along a Z direction that is intended to be aligned approximately parallel to the rotation axis of a CRS optical pen when calibration measurements are performed (e.g., see reference central axis 820 and rotation axis 860 of FIG. 8A). The first nominally cylindrical calibration surface 904 as illustrated is arranged at a known first radius Rc from the central axis 905 that extends along the Z axis.

Figure 9C:
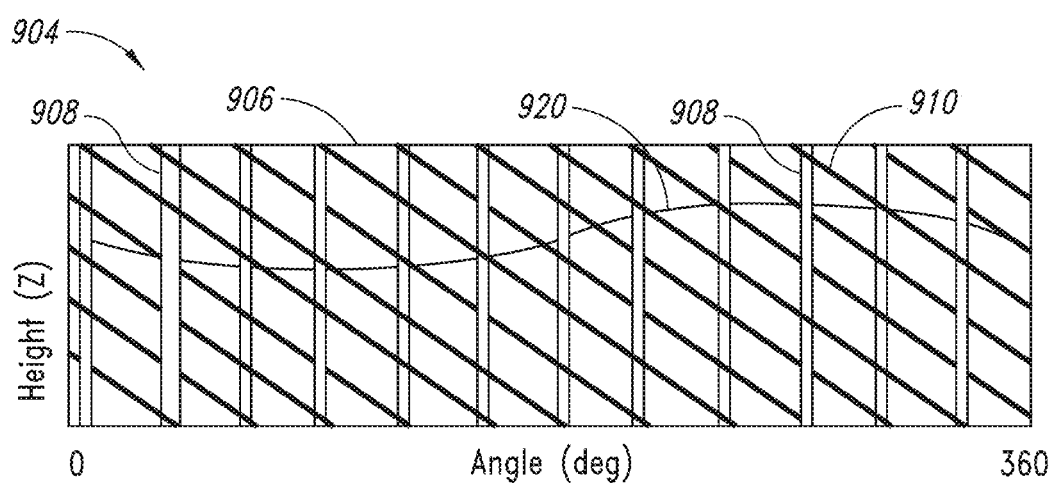
Figure 9D:
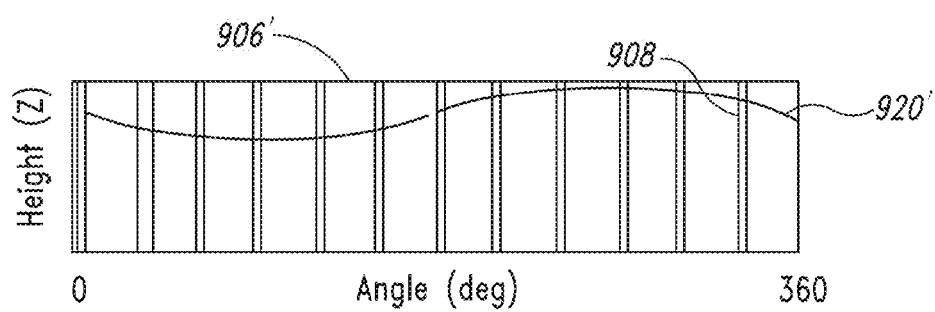

Example patterns are conceptually illustrated in FIGS. 9C and 9D, which show example patterns in the form of a rolled-out print proof or bore map of a pattern to be applied to or formed in the inner surface 904. The printed or textured pattern 906 may include a first set of angular reference features (e.g., reference lines, etc.) formed on or in the first nominally cylindrical calibration surface, wherein the angular reference features are configured to be sensed by the radial distance sensing beam and are located at known angles or known angular spacings around the central axis from one another on or in the first nominally cylindrical calibration surface. The features of the patterns can be detected by an optical pen, such as the optical pen 220A of FIGS. 7A to 7C. For example, black and white, grayscale or different colors in printed patterns, different depths or shapes of textured patterns, and various combinations thereof may be employed in various embodiments.

As illustrated in FIG. 9C, the pattern 906 has azimuth indicator or vertical reference lines 908 spaced apart at known intervals, which may be regular or irregular, and Z axis indicator or angled reference lines 910 spaced apart at known intervals, which may be regular or irregular. The vertical lines 908 provide azimuth positional calibration information and angled lines 910 provide z-axis positional calibration information in relation to the azimuth indicator or vertical reference lines 908. The lines 908, 910 may have uniform thicknesses or may have varying thicknesses. For example, one of the vertical lines 908 as illustrated is a reference line having a different thickness than the other vertical lines to indicate a particular azimuth position on the calibration gauge 946. Multiple reference lines may be employed to indicate multiple specific positions on the calibration gauge (e.g., a midpoint). When the pattern is a textured pattern, the pattern 906 of FIG. 9C may represent a bore map indicating positions of indentions or protrusions formed in the inner surface 904 of the calibration object. In certain implementations, the inner surface 904 may otherwise be smooth.

For ease of illustration, the vertical lines 908 of the pattern 906 of FIG. 9C are shown as white bars and the diagonal lines 910 are shown as black bars. In practice for printed pattern embodiments, the same color may be used for both types of bars (e.g., black), various colors may be used for both types of bars (e.g., to indicate an angular position associated with the bar), etc., and various combinations thereof. As noted above, for textured patterns, indentations may be employed, which may have different widths and depths to facilitate the measurement of calibration information.

FIG. 9C also illustrates an example calibration measurement trace 920. Positional information related to the measurement trace 920 taken by the optical pen 220A (e.g., position information provided by the encoder 630 of FIG. 6 as the measurements related to the trace 920 are taken) may be used together with measurement results associated with the trace 920 (e.g., radial distance measurement data, Z position measurement data) as calibration data or information or to generate calibration data or information, for example based on differences between the measured results and ideal results at respective measurement positions.

The pattern 906' of FIG. 9D is similar to the pattern 906 of FIG. 9C, except that the pattern 906' does not include the angular lines 910 of the pattern 906 of FIG. 9C, and thus the trace 920' measures the calibration information related to the calibration object using only the vertical lines 908. Z-axis calibration information, if desired, may be obtained through other means, e.g., detecting the edge of the top or the bottom surface of the calibration object 946 as the calibration object is moved into position, etc. Other patterns may also or alternatively be employed (e.g., angled grids, horizontal plus angular lines, etc.) in some embodiments.

Figure 10:
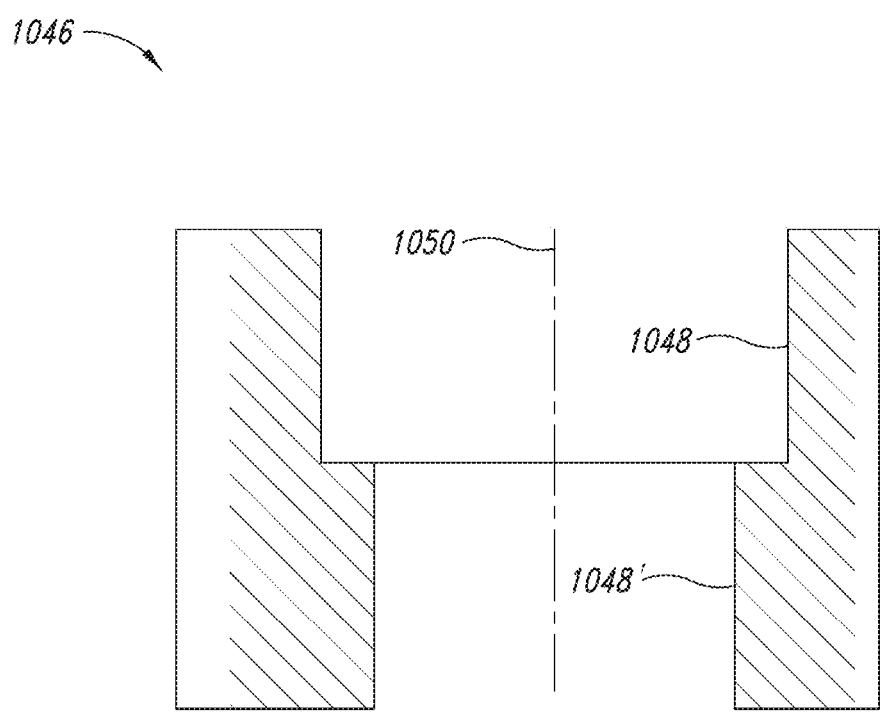
FIG. 10 illustrates an example embodiment of a calibration object which takes a form of a stepped ring gauge.

FIG. 10 is a cross-sectional view of a second embodiment of a calibration object 1046 having a central axis 1005. The calibration object 1046 is a stepped diameter ring gauge having a first inner surface 1048 with a first diameter, and a second inner surface 1048' with a second diameter, smaller than the first diameter. One or both of the first inner surface 1048 and the second inner surface 1048' may be a patterned surface (e.g., having printed or textured pattern, see FIGS. 9C and 9D), for use in the taking of calibration measurements. The use of a stepped diameter ring gauge 1046 facilitates taking calibration measurements at multiple measurement distances, as well as the taking of Z axis-related calibration measurements. The calibration gauge extension 744 (see FIGS. 7A-7C), may position the calibration gauge 1046 at a first extended position with respect to the measurement beam 296 to facilitate the taking of calibration readings of the first inner surface 1048, and may position the calibration gauge 1046 at a second extended position with respect to the measurement beam 296 to facilitate the taking of calibration readings of the second inner surface 1048'. Detection of transitions between the first inner surface 1048 and the second inner surface 1048' may be used to obtain Z-axis calibration information in some embodiments.

Figure 11A:
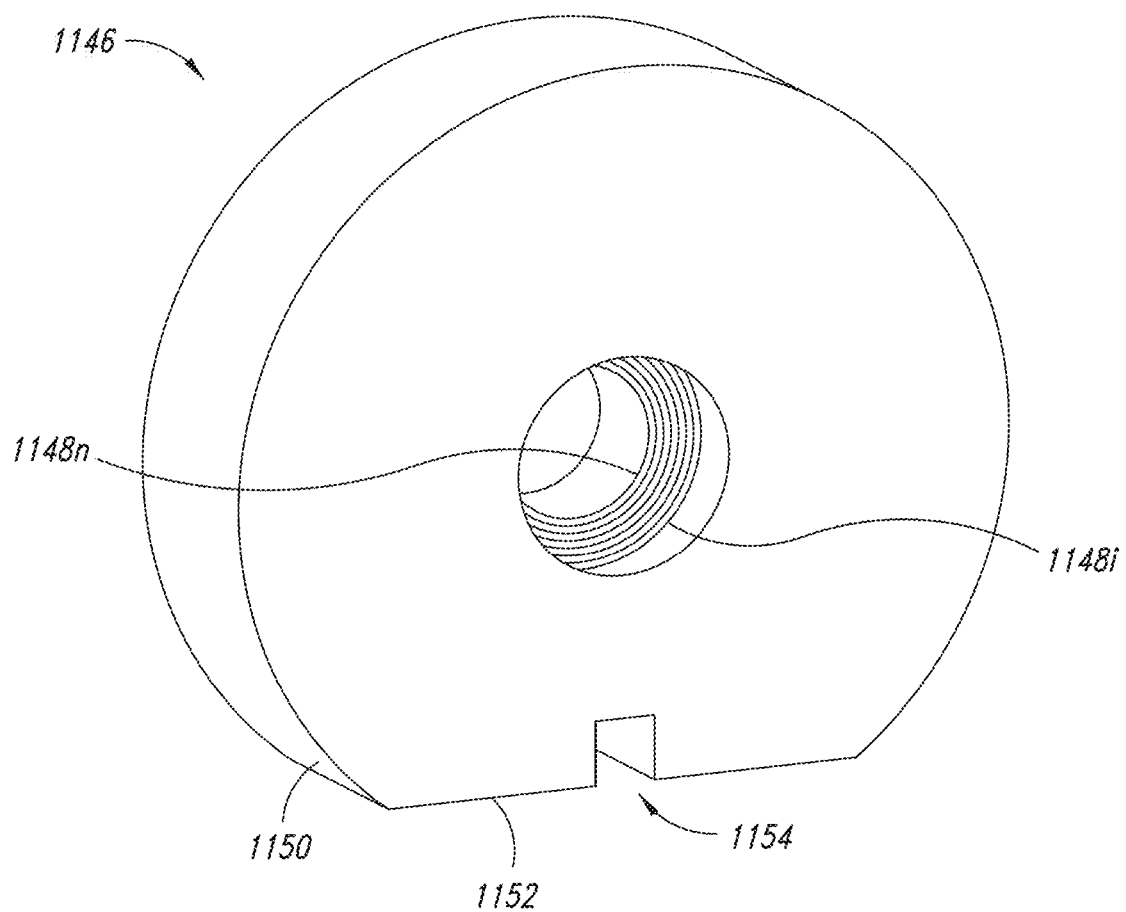
FIGS. 11A to 11C are cross-sectional and conceptual diagrams illustrating another example embodiment of a calibration object which takes a form of a stepped ring gauge.
Figure 11B:
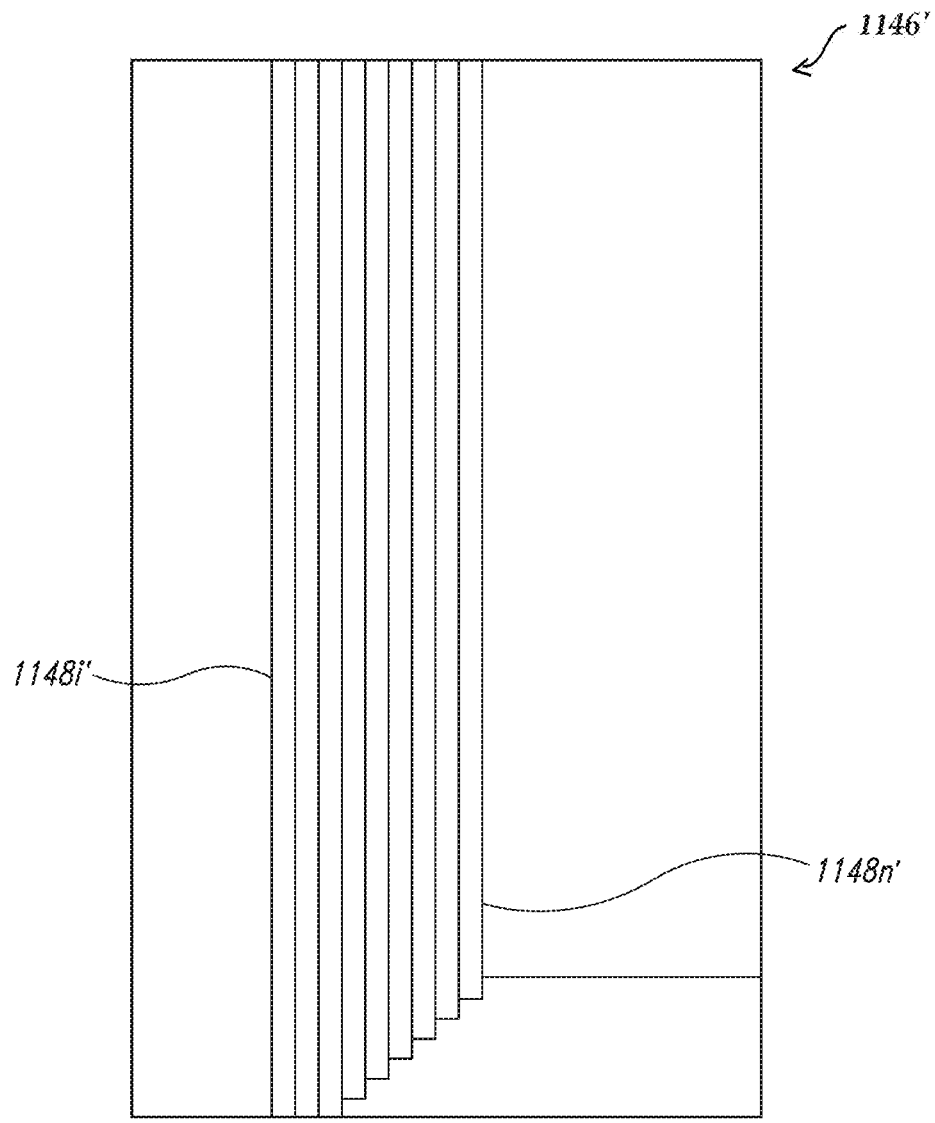
Figure 11C:
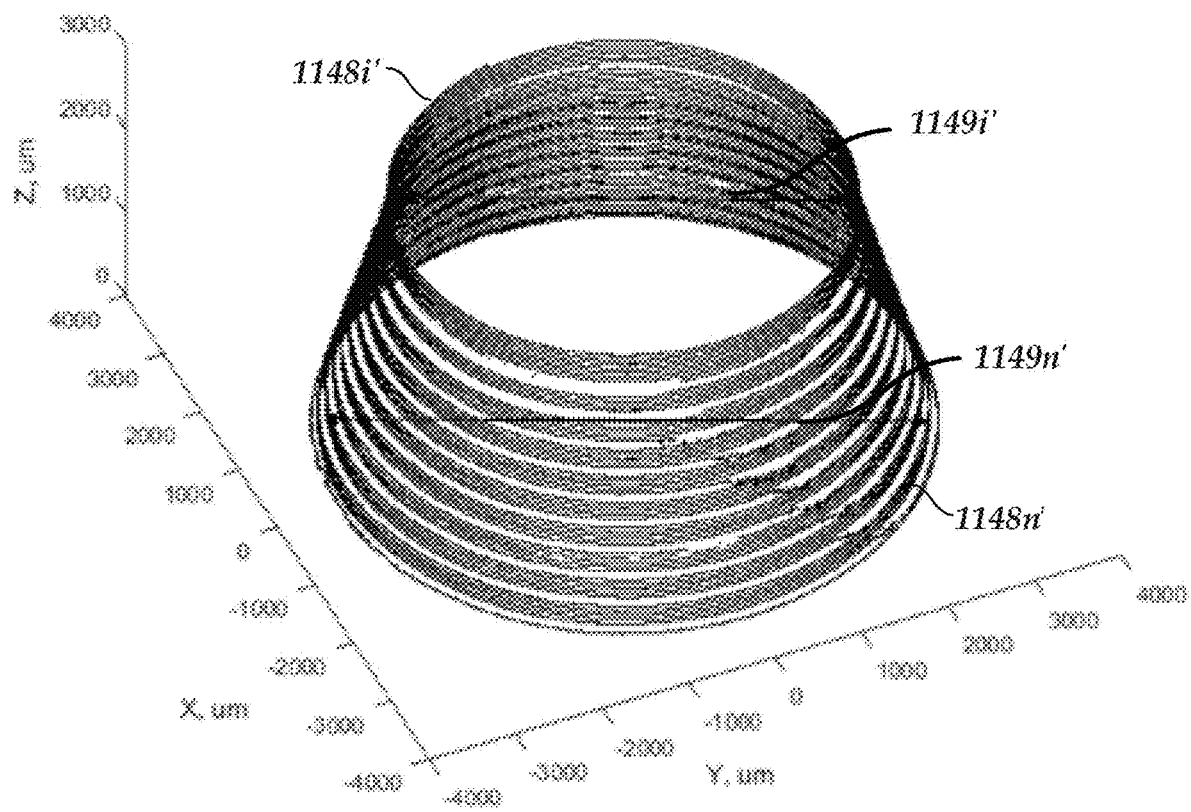

FIG. 11A is a perspective view of another embodiment of a calibration object 1146 in the form of a ring gauge, while FIGS. 11B and 11C are conceptual illustrations of certain aspects of a calibration object 1146' in the form of a ring gauge, similar to that of FIG. 11A. The calibration object 1146 of FIG. 11A has a plurality of inner circular-shaped surfaces 1148$i$ to 1148$n$ with stepped diameters 1149$i$ to 1149$n$, and the similar calibration object 1146' of FIGS. 11B and 11C has a plurality of inner circular-shaped surfaces 1148$i$' to 1148$n$' with stepped diameters 1149$i$' to 1149$n$'. One or more of the inner circular-shaped surfaces 1148$i$ to 1148$n$ or 1148$i$' to 1148$n$' may be patterned surfaces (e.g., having printed or textured patterns, see FIGS. 9C, 9D, 13D and 13E), for use in the taking of calibration measurements. In the version of FIG. 11A, there are seven stepped inner surfaces, while in the version of FIGS. 11B and 11C there are ten stepped inner surfaces. FIG. 11B is in the form of a rolled-out or bore map of the ten stepped inner surfaces of the ring gauge 1146'. FIG. 11C shows a 3D plot of representative measurement data collected in a spiral scan in the Z direction using a rotating optical pen on the stepped inner diameters 1149$i$' to 1149$n$' of the inner circular-shaped surfaces 1148$i$' to 1148$n$' of the ring gauge 1146'. The use of multiple stepped surfaces in the calibration objects 1146 and 1146' facilitates obtaining measurements (e.g., radial distance measurements) over a range of distances, which may be used to generate calibration information for a range of CRS distances of an optical pen, as well as the obtaining of Z-axis calibration data.

The outer surface 1150 of the ring gauge 1146 as illustrated in FIG. 11A has a flat face 1152 including a recess 1154. The flat face 1152 and the recess 1154 may facilitate the arrangement of the ring gauge 1146 by a calibration gauge extension in a constrained relationship relative to a rotating chromatic range sensor configuration of an optical pen (see calibration gauge extension 744 of optical pen 220A of FIGS. 7A to 7C). Specifically, the flat face 1152 may serve as a reference surface for the azimuth rotation angle ω of the optical pen as mounted in a measurement platform (to set ω=0), and the orthogonal surfaces of the recess 1154 may serve as a reference for alignment to a Z-axis direction. For example, the flat face 1152 and the recess 1154 may be sized and shaped to receive a corresponding tab or protrusion (not shown) of a calibration gauge extension to hold the ring gauge 1146 in a constrained relationship with respect to a rotating chromatic range sensor configuration. Other positioning schemes may be employed (e.g., flat faces on opposite sides of the ring gauge, recesses having different shapes, tabs on calibration object and corresponding recesses on the calibration gauge extension, etc., and various combinations thereof).

Figure 12A:
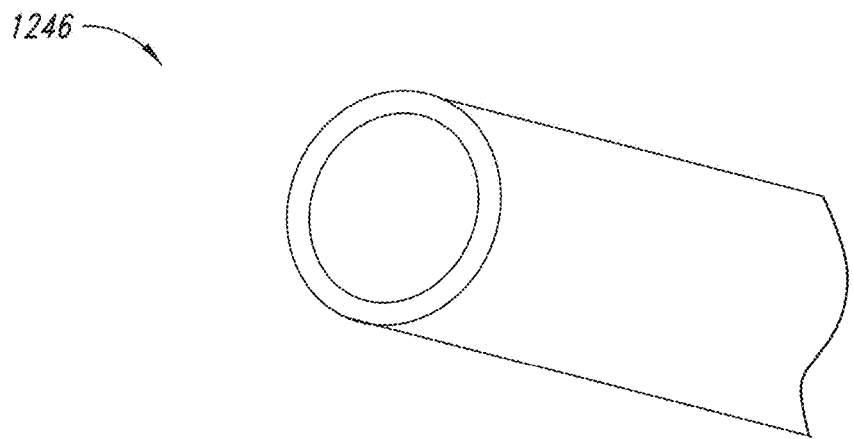
FIGS. 12A to 12C illustrate example embodiments of a calibration object which takes the form of one or more precision glass tubes.
Figure 12B:
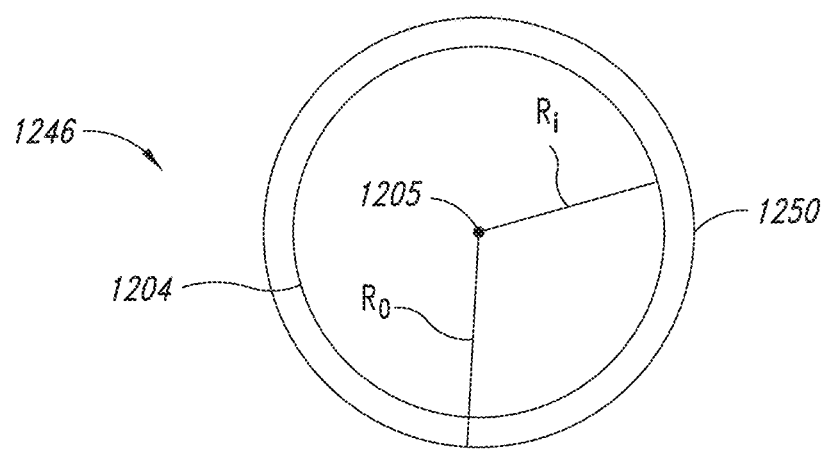

FIG. 12A is a perspective view and FIG. 12B is a cross-sectional view of another embodiment of a calibration object 1246 in the form of a precision glass tube. With reference to FIG. 12B, the precision glass tube 1246 has a nominally cylindrical inner surface 1204 and a nominally cylindrical outer surface 1250. One or both of the inner surface 1204 and the outer surface 1250 may be patterned surfaces (e.g., having printed or textured patterns, see FIGS. 9C, 9D, 13D and 13E), for use in the taking of calibration measurements. The patterns of a nominally cylindrical surface may include non-patterned portions (e.g., gaps or windows between reference lines) to facilitate taking measurements related to a pattern on another nominally cylindrical surface. For example, a pattern on nominally cylindrical inner surface 1204 may have gaps or windows (see windows 1374 of FIG. 13D) through which features of a pattern on nominally cylindrical surface 1250 may be viewed, measured, or otherwise detected.

The inner surface 1204 and the outer surface 1250 are nominally cylindrical calibration surfaces having a central axis 1205 that extends along a Z direction that is intended to be aligned approximately parallel to the rotational axis of a CRS optical pen (e.g., see reference central axis 820 and rotation axis 860 of FIG. 8A) when calibration measurements are performed. The first nominally cylindrical calibration surface 1204 as illustrated is arranged at a known first radius Ri from the central axis 1205 that extends along the Z axis. The second nominally cylindrical calibration surface 1250 as illustrated is arranged at a known second radius Ro from the central axis 1205 that extends along the Z axis.

In some embodiments, the inner surface 1204 may have a pattern used for measuring one type of calibration information (e.g., a pattern which facilitates measuring angular positional information) and the outer surface 1250 may have a pattern which facilitates measuring another type of calibration information (e.g., a pattern which facilitates measuring Z axis-related positional information). In some embodiments, the outer surface 1250 may be a patterned surface, while the inner surface 1204 may be a transparent or semi-transparent surface without a pattern. In such embodiments, distance (radius) measurements may be obtained by detecting the inner surface 1204 and the outer surface 1250 (e.g., with conversion from optical thickness to physical thickness using a known or measured refractive index of the material as needed), and angular and Z axis positional measurements may be obtained by detecting features of the pattern of the outer surface 1250.

Figure 12C:
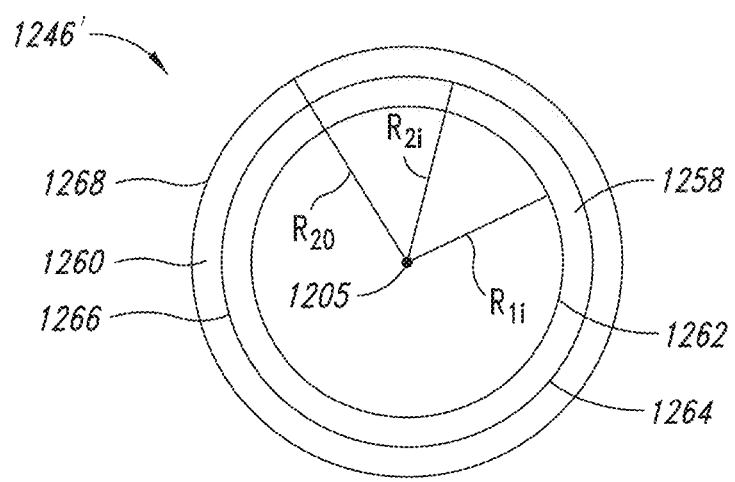

FIG. 12C illustrates an embodiment of a calibration object 1246' comprising two nested precision glass tubes, an inner tube 1258 and an outer tube 1260. The inner tube 1258 has an inner nominally cylindrical calibration surface 1262 and an outer nominally cylindrical calibration surface 1264. The outer tube 1260 has an inner nominally cylindrical calibration surface 1266 and an outer nominally cylindrical calibration surface 1268. The calibration surfaces 1262, 1264, 1266, 1268 have a central axis 1205 that extends along a Z direction that is intended to be aligned approximately parallel to the rotation axis of a CRS optical pen when calibration measurements are performed (e.g., see reference central axis 820 and rotation axis 860 of FIG. 8A). The nominally cylindrical calibration surface 1262 as illustrated is arranged at a known radius $R_{1i}$ from the central axis 1205 that extends along the Z axis. The nominally cylindrical calibration surfaces 1264 and 1266 as illustrated are each approximately arranged at a known radius $R_{2i}$ from the central axis 1205 that extends along the Z axis (for ease of illustration, the difference between the radius of the nominally cylindrical calibration surfaces 1264 and 1266 is assumed to be negligible). The nominally cylindrical calibration surface 1268 as illustrated is arranged at a known radius $R_{2o}$ from the central axis 1205 that extends along the Z axis.

One or more of the nominally cylindrical inner surface 1262 of the inner tube 1258, the nominally cylindrical outer surface 1264 of the inner tube 1258, the nominally cylindrical inner surface 1266 of the outer tube 1260 and the nominally cylindrical outer surface 1268 of the outer tube 1260 may be patterned surfaces (e.g., having printed or textured patterns, see FIGS. 9C, 9D, 13D and 13E), for use in the taking of calibration measurements.

The patterns of a nominally cylindrical surface may include non-patterned portions (e.g., gaps between reference lines or windows) to facilitate taking measurements related to a pattern on another nominally cylindrical surface. For example, a pattern on nominally cylindrical inner surface 1262 of the inner tube 1258 may have gaps or windows through which features of a pattern on nominally cylindrical inner surface 1266 of the outer tube 1260 may be viewed, measured, or otherwise detected, in a manner similar to that discussed above with reference to FIG. 12B.

In some embodiments, the outer surface 1268 of the outer tube 1260 may be a patterned surface, while other surfaces of the inner tube 1258 and the outer tube 1260 may be transparent or semi-transparent surfaces without a pattern. Distance (radius) measurements may be obtained by detecting one or more of the inner surface 1262 of the inner tube 1258, the outer surface 1264 of the inner tube 1258, the inner surface 1266 of the outer tube 1260, and the outer surface 1268 of the outer tube 1260, and azimuth and Z axis-related positional measurements may be obtained by detecting features of the pattern of the outer surface 1268 of the outer tube 1260. Various combinations of patterned and non-patterned surfaces and/or of types of patterns may be employed in some embodiments. Additional nested tubes may be employed in some embodiments. A bottom cap or other holding structure may be employed to hold the nested tubes 1258, 1260 in position with respect to each other. A nested glass tube embodiment facilitates obtaining calibration information over a range of CRS measurement distances of an optical pen, as well as the obtaining of Z-axis calibration data, without repositioning the calibration object for multiple gauge distance measurements. Physical distances may be obtained from optical distances or thicknesses as needed in a manner similar to that discussed above with reference to FIG. 12B.

FIGS. 13A to 13E illustrate embodiments of a calibration object 1346 in the form of a plurality of nested precision metal tubes 1358, 1360 and 1370. In FIGS. 13A to 13E, the size of the nested metal tubes 1358, 1360 and 1370 is exaggerated, and the spacing between tubes may be assumed to be negligible or may be exaggerated for ease of illustration. Some embodiments may employ more than the three nested metal tubes as illustrated (e.g., 7 or more tubes, etc.)

Figure 13A:
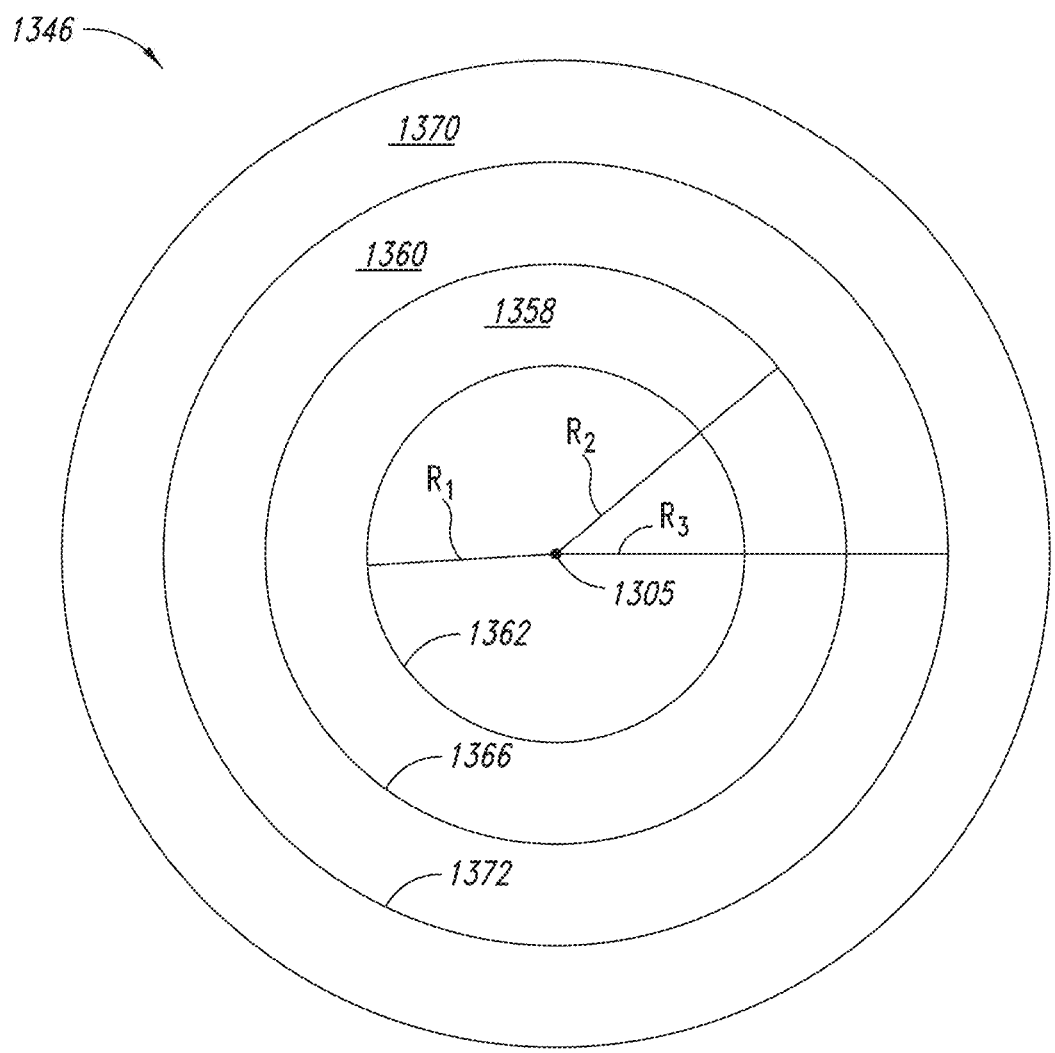

FIG. 13A is a cross-sectional view of the calibration object 1346. The precision metal tube 1358 has an inner surface 1362, the precision metal tube 1360 has an inner surface 1366 and the precision metal tube 1370 has an inner surface 1372. The inner surfaces 1362, 1366 and 1372 are nominally cylindrical calibration surfaces having a central axis 1305 that extends along a Z direction that is intended to be aligned approximately parallel to the rotation axis of a CRS optical pen (e.g., see reference central axis 820 and rotation axis 860 of FIG. 8A) when calibration measurements are performed. The nominally cylindrical calibration surfaces 1362, 1366 and 1372 are arranged at known radii (as illustrated, respectively $R_1$, $R_2$ and $R_3$) from the central axis 1305 that extends along the Z axis.

Figure 13B:
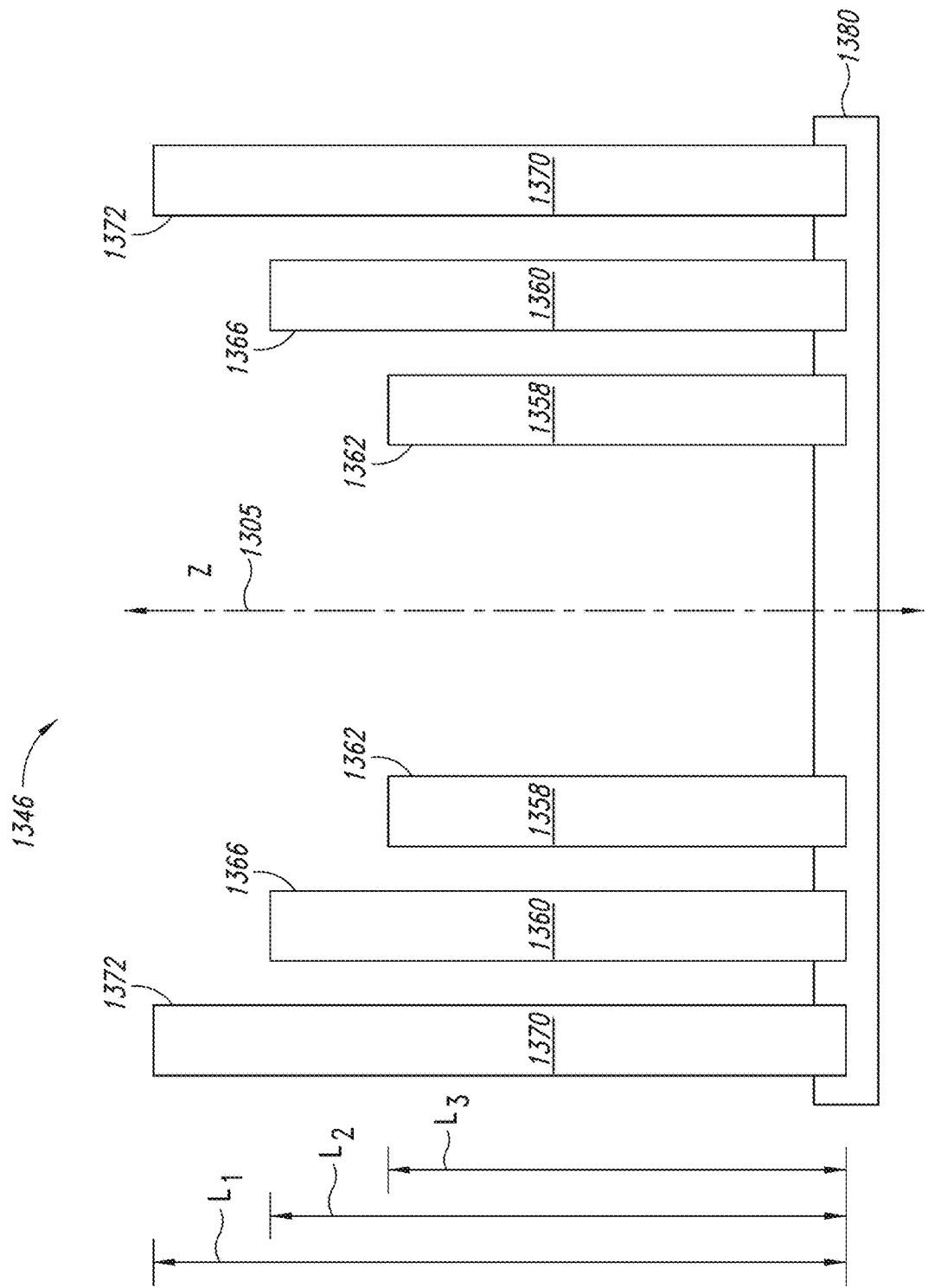

FIG. 13B is a side cross-sectional view illustrating an embodiment in which the nested metal tubes 1358, 1360 and 1370 have different lengths L1, L2, L3 along the Z axis 1305. A portion of one or more of the inner surface 1362 of the metal tube 1358, the inner surface 1366 of metal tube 1360 and the inner surface 1372 of the tube 1370 may be a patterned surface (e.g., having printed or textured patterns, see FIGS. 9C and 9D), for use in the taking of calibration measurements in a manner similar to that described above with respect to the stepped diameter ring gauge 1046 of FIG. 10 and stepped diameter ring gauges 1146 and 1146' of FIGS. 11A to 11C.

The calibration gauge extension 744 (see FIGS. 7A-7C) may position the calibration gauge 1346 at a first extended position with respect to the measurement beam 296 to facilitate the taking of calibration readings of the inner surface 1362, may position the calibration gauge 1346 at a second extended position with respect to the measurement beam 296 to facilitate the taking of calibration readings of the inner surface 1366, and may position the calibration gauge 1346 at a third extended position with respect to the measurement beam 296 to facilitate the taking of calibration readings of the inner surface 1372. Detection of transitions between the inner surfaces 1362, 1366, 1372 may be used to obtain Z-axis calibration information, in addition to or instead of Z-axis calibration information based on patterns on one or more of the inner surfaces 1362, 1366, 1372. In various implementations, other configurations may also or alternatively be utilized (e.g., a pattern may be included on an inner surface of an outer tube as viewed through an opening or window in an inner tube, etc., as will be described in more detail below with respect to FIGS. 13D and 13E).

Figure 13D:
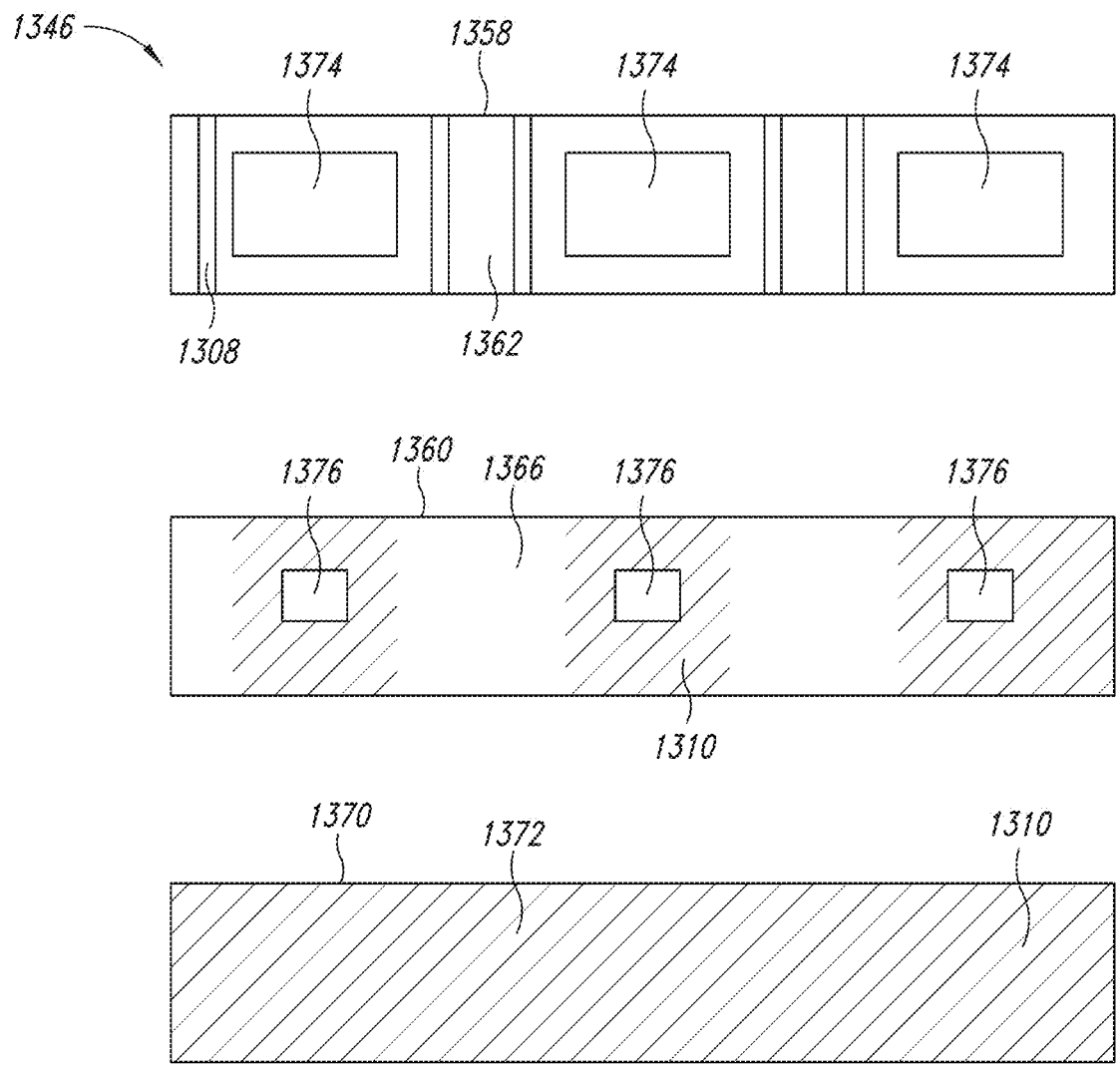
Figure 13E:
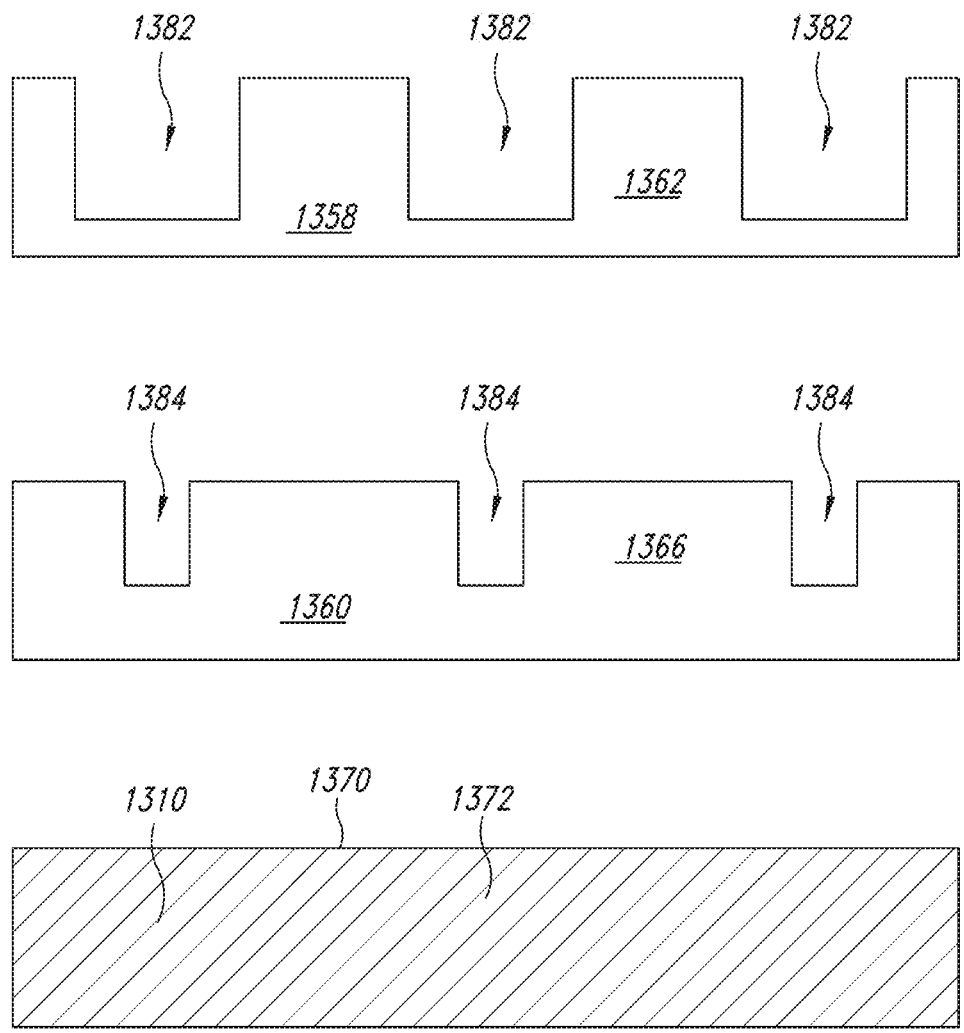

FIGS. 13C to 13E illustrate an embodiment of the calibration gauge 1346 in which the nested metal tubes 1358, 1360 and 1370 may generally have a same length L1 along the Z axis 1305. The lengths may be slightly tapered (not shown) to facilitate providing good concentricity and alignment. As discussed in more detail below with respect to FIGS. 13D to 13E, which conceptually illustrate example patterns, the inner tubes (as illustrated, the metal tube 1358 and the metal tube 1360) may have patterns in the form of windows or cuts extending through the sides of the tubes around the circumference to allow the measurement beam 296 to pass through to larger radius tube wall(s). One or more of the remaining portions of the inner surface 1362 of tube 1358, the inner surface 1366 of tube 1360, and the inner surface 1372 of tube 1370 may comprise patterned surfaces (e.g., having printed or textured patterns, see FIGS. 9C and 9D), for use in the taking of calibration measurements in a manner similar to that described above.

As illustrated, the calibration object 1346 has a cap 1380 to hold the tubes 1358, 1360, 1370 in position with respect to one another. The calibration gauge extension 744 (see FIGS. 7A-7C) may engage with the cap 1380 to arrange the calibration gauge 1346 in a constrained relationship with respect to a rotating chromatic range sensor configuration (see FIGS. 7A-7C). A nested metal tube embodiment as illustrated in FIGS. 13D and 13E facilitates obtaining calibration information over a range of CRS distances of an optical pen, as well as the obtaining of Z-axis calibration data, without repositioning the calibration object for each gauge distance $R_1$, $R_2$, $R_3$.

FIG. 13D conceptually illustrates the calibration object 1346 in which the inner nested tube 1358 has a pattern in the form of windows 1374 extending through the tube 1358, and the middle nesting tube has a pattern in the form of windows 1376 extending through the tube 1360. FIG. 13D illustrates an example pattern in the form of a rolled-out window/print proof/bore map of a pattern or patterns to be applied to or formed in the inner surfaces 1362, 1366, 1372 of the tubes 1358, 1360, 1370.

The windows 1374 of the inner tube 1358 and the windows 1376 of the middle tube are sized, and the inner and middle tubes 1358, 1360 are positioned so that, in operation, a rotating chromatic range sensor configuration (see FIGS. 7A-7C) can detect the windows 1376 of the tube 1360 though the openings of the windows 1374 in the tube 1358, and can detect a portion of the inner surface 1372 of the outer tube 1370. The detection of the windows 1374, 1376 and surfaces 1362, 1366, 1372 by a rotating chromatic range sensor configuration (see FIGS. 7A-7C) may provide calibration measurement data for use as or to generate calibration data or information.

In addition, one or more of the inner surfaces 1362, 1366, 1372 may include patterned surfaces (e.g., having printed or textured patterns, see FIGS. 9C and 9D), which may also be used to take calibration measurements. As illustrated, surface 1362 of tube 1358 includes vertical pattern lines 1308, surface 1366 of tube 1360 includes angled lines 1310, and surface 1372 of tube 1370 includes angled lines 1310. While the windows 1374, 1376 as illustrated are vertical rectangles, some or all of the windows may have angled sides, which may be employed to provide Z axis calibration measurement data (e.g., instead of or in addition to, the angled lines 1310).

The embodiment illustrated in FIG. 13E is similar to the embodiment of FIG. 13D, except that instead of windows, the inner nested tube 1358 has a pattern in the form of cuts 1382 extending through the tube 1358, and the middle nesting tube has a pattern in the form of cuts 1384 extending through the tube 1360. FIG. 13E illustrates an example pattern in the form of a rolled-out cut/print proof/bore map of a pattern or patterns to be applied to or formed in the inner surfaces 1362, 1366, 1372 of the tubes 1358, 1360, 1370.

The cuts 1382 of the inner tube 1358 and the cuts 1384 of the middle tube 1360 are sized, and the inner and middle tubes 1358, 1360 are positioned with respect to each other so that, in operation, a rotating chromatic range sensor configuration (see FIGS. 7A-7C) can detect the cuts 1384 of the tube 1360 though the openings of the cuts 1382 in the tube 1358, and can detect a portion of the inner surface 1372 of the outer tube 1370 through at least some partially aligned openings of the cuts 1382 and 1384. The detection of the cuts 1382, 1384 and surfaces 1362, 1366, 1372 by a rotating chromatic range sensor configuration (see FIGS. 7A-7C) may provide calibration measurement (distance) data for use as or to generate calibration data or information. In addition, as noted above one or more of the inner surfaces 1362, 1366, 1372 may include patterned surfaces (e.g., having printed or textured patterns, such as angled lines 1310), which may also be used to take calibration measurements.

Figure 14:
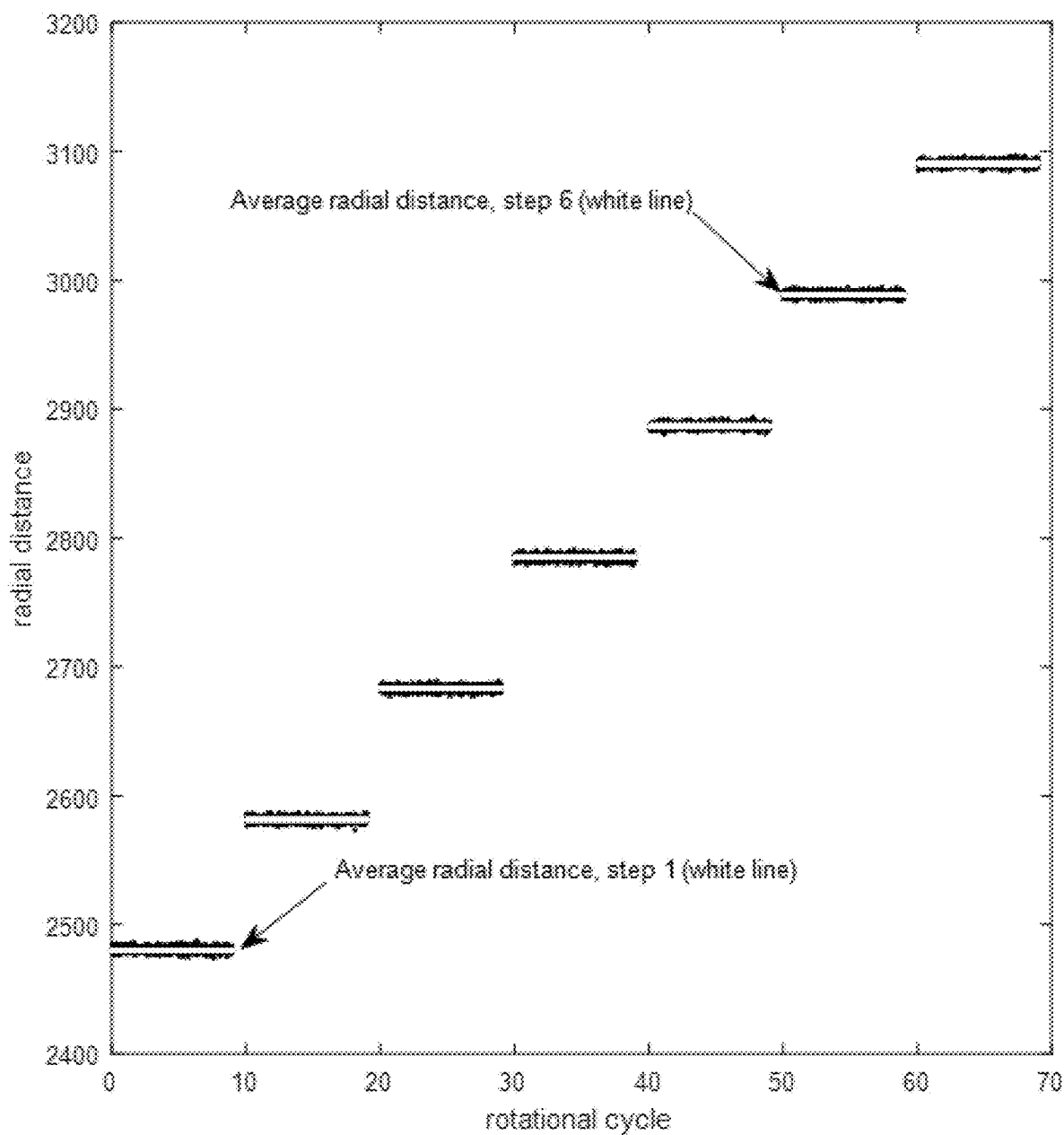
FIG. 14 is a graphical representation of an example set of measured radial data associated with an optical pen.

FIG. 14 is a graphical representation of calibration test data gathered using a calibration object provided for the taking of measurements at seven calibration steps and plotted in cylindrical coordinates (Z-axis into the page). For example, a calibration ring gauge may be utilized having seven or more concentric calibration surfaces, such as stepped calibration surfaces (see, e.g., FIGS. 11A to 11C and 13B), and/or calibration surfaces that may generally be aligned in a plane perpendicular to the Z axis of the rotating chromatic range sensor system (e.g., see FIGS. 12C and 13C to 13E), etc. The vertical axis represents the radial distance measured and the horizontal axis represents the optical pen rotational angle plotted in units of rotational cycles. In some implementations, the measuring at different radial distances may comprise repositioning the calibration object with respect to the Z axis (e.g., adjusting a position of the calibration object using the calibration gauge extension 744 of FIGS. 7A to 7C for calibration objects with stepped surfaces, such as the embodiments shown in FIGS. 11A to 11C and 13B), possibly adjusting control parameters of a probe signal processing and control circuit (see probe signal processing and control circuit 207 of FIGS. 2 and 5), and/or scanning a Z-axis stage built into the extension or platform to make a spiral scan, etc.

Table 1 below illustrates example causes of errors in a rotating chromatic range sensor configuration. See also FIG. 8C, discussed above.

TABLE 1

Misalignments and Resulting Errors

| Misalignment | Example Errors |
|---|---|
| Turning prism orientation (see reflective element 294 of FIG. 6) | Z offset $Z_o$ Azimuth offset $\varphi_o$ Radius scaling (linear correction term ($R_L$) Z scaling (linear correction term ($Z_L$) |
| Rotational axis misalignment with respect to mounting axis and pen optical axis (see Rotational Axis 860 of FIG. 8A and axes m, r, o; labeled in FIG. 8B). | Radius offset $R_o$ Z axis First harmonic error $C_{Z1}$ Radius Second harmonic error $C_{R2}$ |
| Rotation XY offset from mount (see exchange mount 285 of FIG. 6) | Radius First harmonic error $C_{R1}$ Azimuth First harmonic error $C_{\varphi 1}$ |

The errors introduced by misalignments also may be represented using sets of equations, which may be compared to measurement data collected on calibration artifacts to generate calibration data or information used to compensate for the errors (e.g., used to adjust test measurement results). For example, curve fitting to the measured data may be employed to determine the coefficients of the equations representing the errors.

In one example, errors in measurements may be represented by the following relationships (Equation 1):

$$\begin{bmatrix} \Delta R \\ \Delta \varphi \\ \Delta Z \end{bmatrix} = \begin{bmatrix} R_0 + R_L D_C + C_{R1}\cos(2\pi\omega_c + \theta_{R1}) + C_{R2}\cos(4\pi\omega_c + \theta_{R2}) \\ \varphi_0 + \varphi_L D_C + C_{\varphi 1} D_C \sin(2\pi\omega_c + \theta_{\varphi 1}) + C_{\varphi 2} D_C \sin(4\pi\omega_c + \theta_{\varphi 2}) \\ Z_0 + Z_L D_C + C_{z1} D_C \sin(2\pi\omega_c + \theta_{z1}) + C_{z2} D_C \sin(4\pi\omega_c + \theta_{z2}) \end{bmatrix}$$

where the measurement input data variables are $D_C$ and $\omega_c$ ($Z_c$, which does not appear above, is a third measurement input that can be collected); the errors in measurements are $\Delta R$, $\Delta \varphi$ and $\Delta Z$; and the fitting coefficients up to second harmonics are the remainder of symbols, all as defined below:

$D_C$ represents the compensated distance measurement data from the optical pen, which is calibrated to be linear when not rotating, but may have an offset and scaling error when used in rotational measurement, resulting from various mechanical misalignments in the measurement system;

$\omega_c$ represents the compensated rotary angle output of the optical pen rotary encoder;

$Z_c$ represents the compensated Z-axis stage position output of the optical pen rotary encoder platform;

$\Delta R$ represents the radial distance measurement error, which contains terms having the following coefficients:

$R_0$ represents a radial offset constant term;
$R_L$ represents a radial linear (scaling) term coefficient;
$C_{R1}$ represents a radial first harmonic term amplitude coefficient;
$\theta_{R1}$ represents a radial first harmonic term phase coefficient;
$C_{R2}$ represents a radial second harmonic amplitude coefficient;

$\theta_{R2}$ represents a radial second harmonic term phase coefficient;

$\Delta \varphi$ represents the azimuth measurement error, which contains terms having the following coefficients:

$\varphi_0$ represents an azimuth offset constant term;
$\varphi_L$ represents an azimuth linear (scaling) term coefficient;
$C_{\varphi 1}$ represents an azimuth first harmonic amplitude coefficient;
$\theta_{\varphi 1}$ represents an azimuth first harmonic phase coefficient;
$C_{\varphi 2}$ represents an azimuth second harmonic amplitude coefficient;
$\theta_{\varphi 2}$ represents an azimuth second harmonic phase coefficient;

$\Delta Z$ represents the Z-axis measurement error, which contains terms having the following coefficients:

$Z_0$ represents a Z-axis offset constant term;
$Z_L$ represents a Z-axis linear (scaling) term coefficient;
$C_{z1}$ represents a Z-axis first harmonic term amplitude coefficient;
$\theta_{Z1}$ represents a Z-axis first harmonic term phase coefficient;
$C_{z2}$ represents a Z-axis second harmonic term amplitude coefficient;
$\theta_{Z2}$ represents a Z-axis second harmonic term phase coefficient;

where the second harmonic terms may be treated as negligible in some embodiments. In other embodiments, second and even higher harmonic terms may be included.

The fully compensated measurements for a rotating CRS measurement system may be represented in cylindrical coordinates by the following relationships (Equation 2):

$$\begin{bmatrix} R \\ \varphi \\ Z \end{bmatrix}_{RCPS,c} = \begin{bmatrix} D_c - \Delta R \\ \varphi_c - \Delta \varphi \\ Z_c - \Delta Z \end{bmatrix}$$

Where terms on the right are defined as above, and $R_{RCPS,c}$ represents the fully compensated, measured radial distance;

$\varphi_{RCPS,c}$ represents the fully compensated, measured azimuth angle;

$Z_{RCPS,c}$ represents the measured Z-axis distance.

FIG. 14 is an example of a Z-axis projection of compensated data of the calibration artifact shown in FIG. 11B plotted in cylindrical coordinates. The data is compensated for at least Radius offset.

The data may be transformed from cylindrical coordinates into Cartesian coordinates as follows (Equation 3):

$$\begin{bmatrix} \Delta X \\ \Delta Y \\ \Delta Z \end{bmatrix}_{RCPS,c} = \begin{bmatrix} R \cos(2\pi\varphi) \\ R \sin(2\pi\varphi) \\ Z \end{bmatrix}_{RCPS,c}$$

The transforms may be employed to help visualize the data. FIG. 11C is an example of the data from FIG. 14 transformed to and plotted in Cartesian coordinates. The transforms may also be employed to normalize the data. For example, the data may be transformed into Cartesian coordinates, rotational and translational transformations may be applied to align the data with the Z-axis, and then the data may be transformed back into cylindrical coordinates.

In some cases, measurements of interest may be within a small radius measurement range, and calibration to a single calibration artifact radius is sufficient. In these cases, linear coefficients $R_L$, $\varphi_L$ and $Z_L$ may be set to zero and the fit may only include constant offset terms $R_0$, $\varphi_0$ and $Z_0$ along with harmonic terms as needed (for example only $1^{st}$ and $2^{nd}$ harmonic terms in radius may be needed). In other cases, measurements may span the full radius range of the optical pen, and separate ring gauges or, desirably, a multi-step ring gauge, can be used to calibrate the full range of radii measurements. Potential azimuth and Z-axis errors at different radii can also be calibrated if desired, with a calibration artifact that has the requisite markings or features for azimuth and Z calibration. In such a case, linear fits may include both linear coefficients $R_L$, $\varphi_L$ and $Z_L$ and constant offset terms $R_0$, $\varphi_0$ and $Z_0$. Fits could be to these parameters as well as harmonic coefficients simultaneously. In some cases it may be desirable to average radii data (see "average radial distance" labels in FIG. 14) over complete, integral rotation cycles (thereby averaging out harmonic content) and then fit linearity and offset terms only at the multiple gauge radii $R_i$ average radii data to determine the linear correction coefficients $R_L$, $\varphi_L$ and $Z_L$ and constant offset correction terms $R_0$, $\varphi_0$ and $Z_0$.

Figure 15:
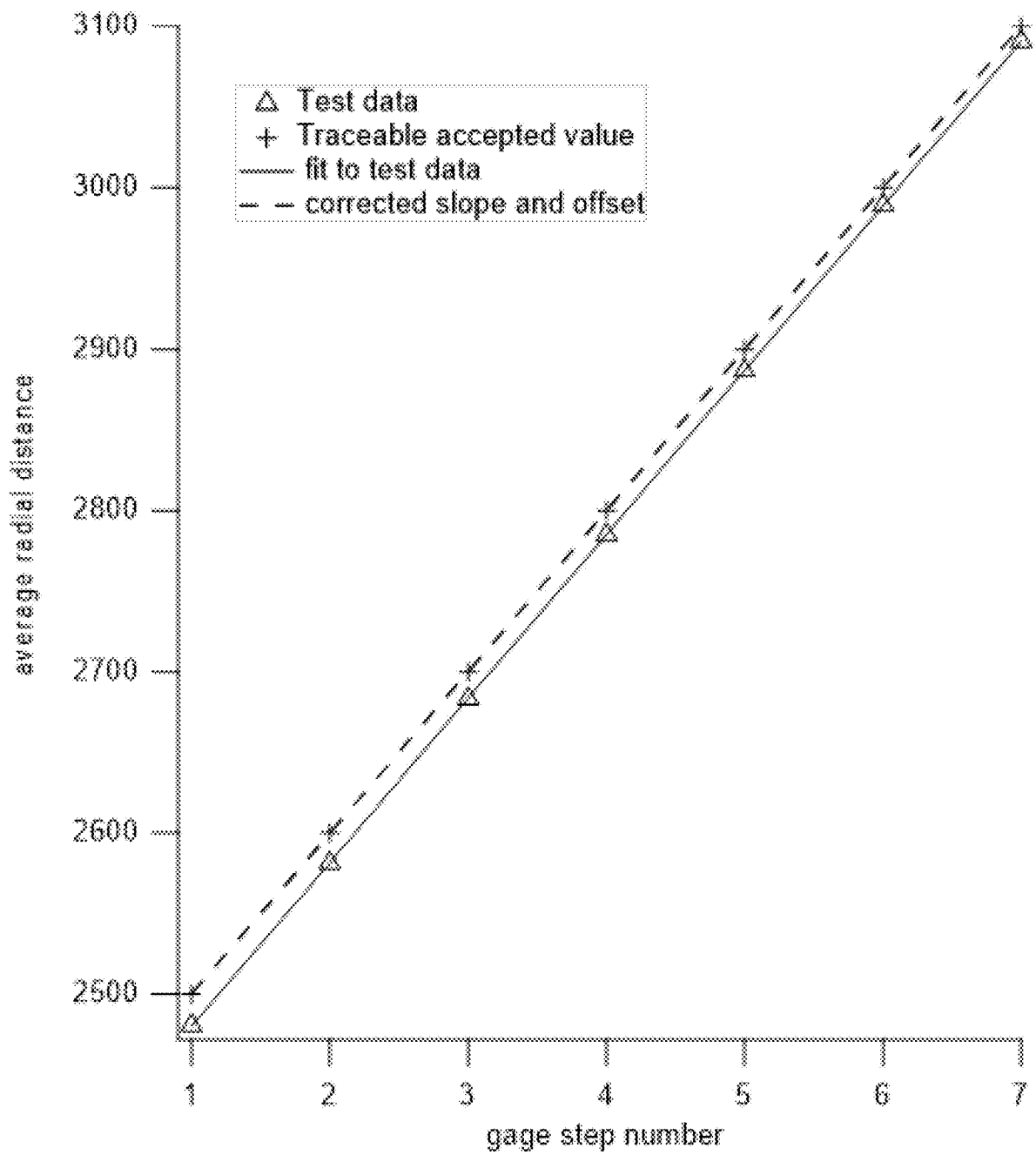
FIG. 15 is a graphical representation of a corrected slope and offset determined based on the example set of measured radial distance data of FIG. 14.

As an example, FIG. 15 is a graphical representation of the calibration test data of FIG. 14 and indications of traceable accepted values. The vertical axis of FIG. 15 represents the average radial distances and the horizontal axis FIG. 15 represents the gauge number (step number in the case of a stepped gauge) of the calibration object. At a given radial distance or step, the difference between the test data and the traceable accepted value corresponds to the radius error ΔR at that distance or step. A line fit directly to the test data shows good linearity but some offset and slope error from the traceable accepted values from the multi-step calibration artifact. A linear fit (dotted line) of measured average radial distances to the traceable accepted values for the radii of the steps (i.e, $\Delta R = R_0 + R_L D_C$ from EQUATION 1) results in a measurement calibrated to the traceable accepted value with corrected slope $R_L$ and offset $R_0$ calibration coefficients determined. The corrected slope and offset may be used to calibrate a rotating point chromatic sensor configuration for accurate radius measurements over the measurement range. Similar corrections can be made for Z-axis and azimuth angle as desired, from Z-axis or azimuth angle reference patterns in calibration artifacts at different radii.

Figure 16:
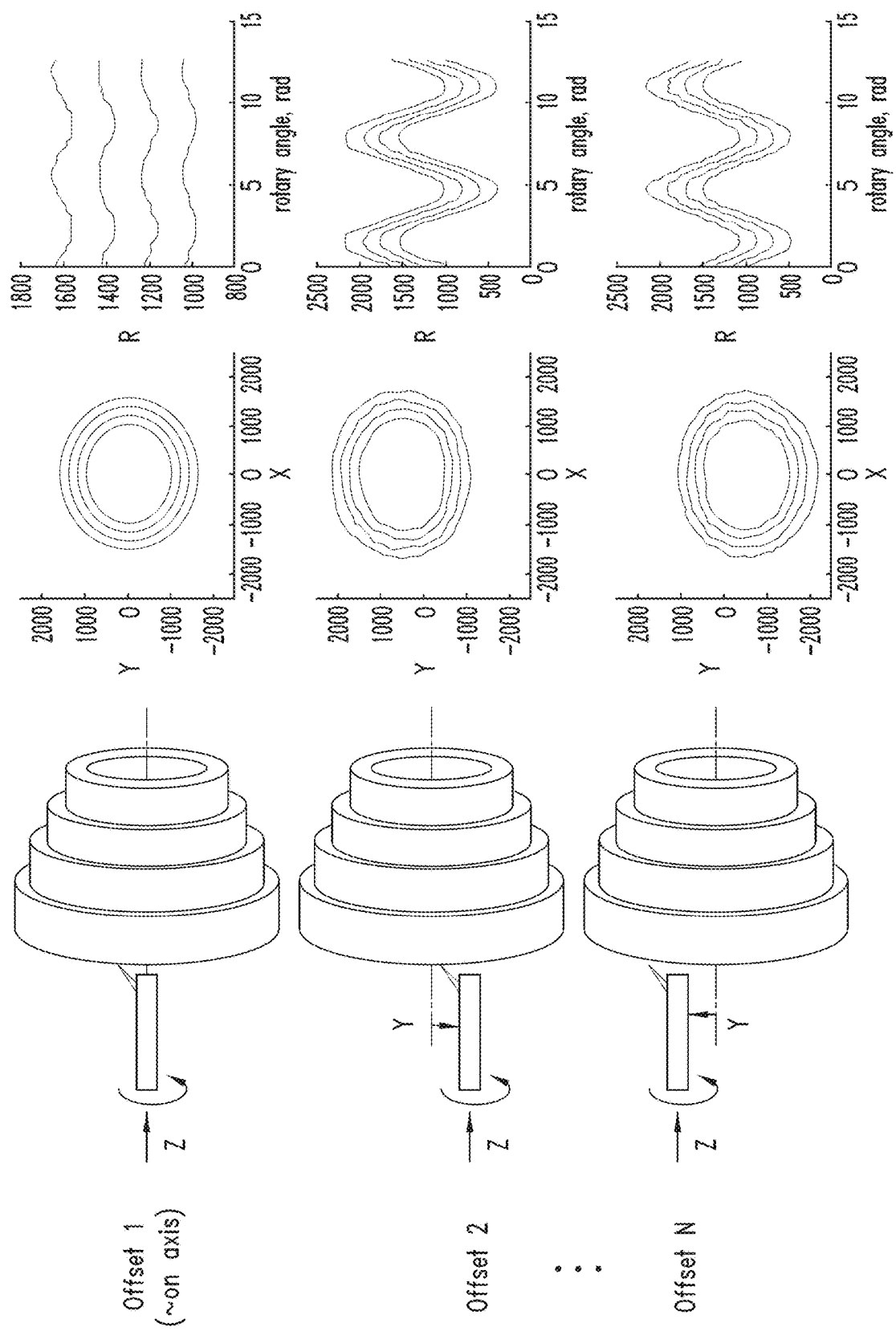
FIG. 16 is a conceptual diagram illustrating an embodiment of obtaining radial distance data at a plurality of gauge distances and a plurality of offsets of the axis of rotation of an optical pen with respect to a central axis of a calibration object.

FIG. 16 is a graphical representation of obtaining a set of more continuous calibration distance measurements at a range of different distances (as illustrated, at four gauge distances) and different offsets (as illustrated, at N offsets). By comparing the measurements at the different gauge distances and offsets, errors that are due to mechanical rotation (which have a common mode in terms of the rotational angle) may be separated from errors that are due to the CRS pen calibration (which have a common mode in terms of the measured CRS distance), for example, by using simultaneous curve fitting.

Through the use of the XY offsets from the axis of a gauge (e.g., a multi-distance gauge) and the use of the gauge distance steps, there may be measurement distance data associated with every CRS distance within a CRS range. This may facilitate a continuous calibration of CRS distance, as opposed to a piecewise linear calibration based simply on the radius at each ring gauge distance or step. For example, a first calibration with an ideal axis of an optical pen centered in the calibration object may be performed to remove harmonic errors. As illustrated in FIG. 16, offset 1 aligns the ideal axis of the optical pen with the center axis of the calibration object. This data may be used to produce a correction at particular radius measurements with small deviations. Calibration distance measurements may then be taken at a plurality of offsets (e.g., offset 2 to offset N) of the ideal axis of the optical pen from the calibration object central axis. In various implementations the generated data may include measurements at a continuous range of radii. In various implementations, the XY offset may result in a small, oscillating deviation in the sensor alignment to the ring gauge or analogous workpiece surface normal. It is possible, depending on surface types of the calibration artifact, that a radius measurement error may result from such a deviation. In such implementations, the surface may be known and the angle deviation may be deterministic, so a look up table or similar calculation may be employed to correct for such an error, if needed.

It will be appreciated that a ring gauge (i.e., calibration object) approach as described herein may be particularly advantageous for calibrating an optical pen when the optical pen's axis is able to be aligned to the ring gauge axis, and workpiece measurements are subsequently made with a corresponding alignment (e.g., a same alignment). Such configurations may be achieved in various platforms (e.g., SCARA robot, vision system, CMM with fixed autojoint, etc.) For example, in some such configurations, the probe may be held in a fixed (e.g., vertical) orientation (i.e., which may be utilized for both a calibration process as well as performing measurements of workpieces), and for a calibration process the ring gauge may be mounted to the platform in a corresponding fixed (e.g., vertical) orientation.

Figure 17:
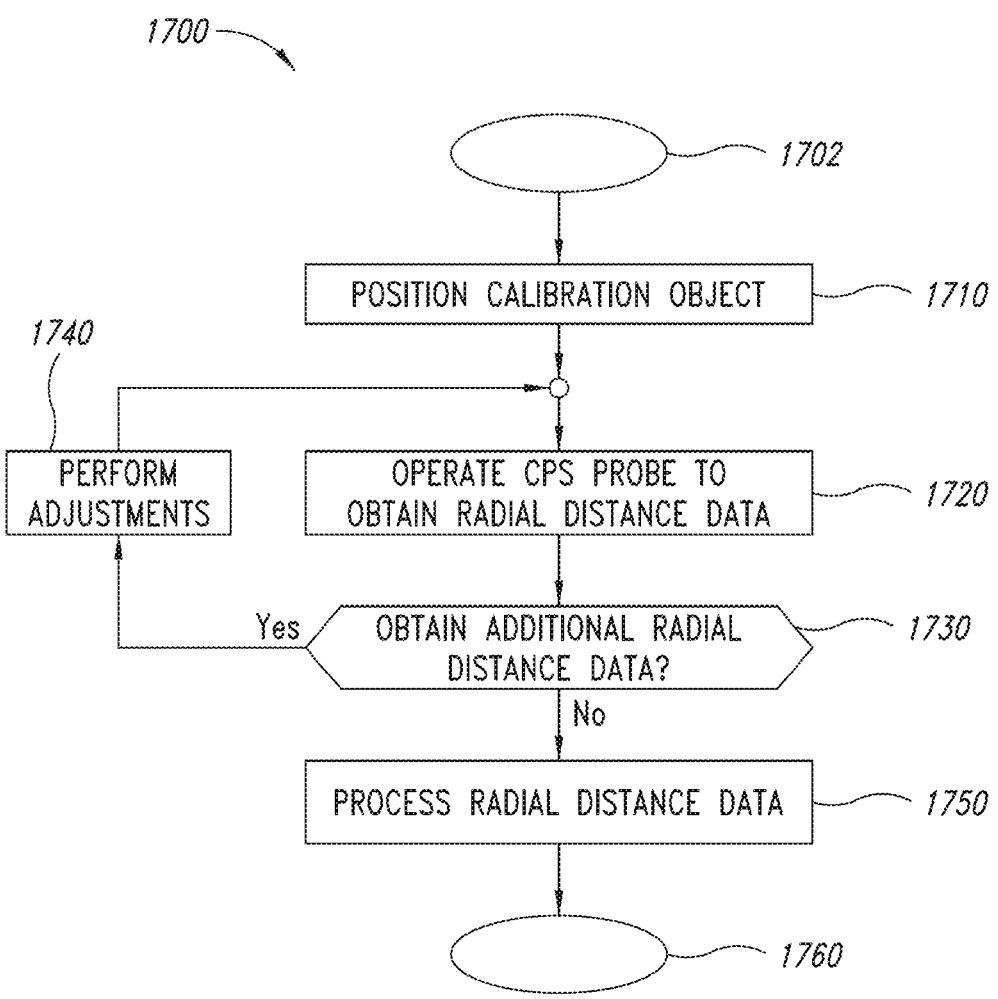
FIG. 17 is a flow diagram illustrating one exemplary embodiment of a routine for calibrating a rotating chromatic range sensor configuration of a CMM.

FIG. 17 is a flow diagram illustrating one exemplary embodiment of a routine 1700 for calibrating a rotating chromatic range sensor configuration of a CMM, which may be employed, for example, by one or more of the embodiments of a CMM with a calibration object as described herein. In an embodiment, the routine provides calibration data or information for correcting misalignment errors for a rotating chromatic range sensor configuration that is configured to direct a radial distance sensing beam along a radial direction relative to a rotation axis, and to rotate the radial distance sensing beam about the rotation axis.

The routine 1700 begins at 1702, when the routine may be called, for example, by a probe signal processing and control circuit (e.g., probe signal processing and control circuit 207 of FIGS. 2 and 5). The routine 1700 proceeds from 1702 to 1710.

At 1710, a calibration object (see, e.g., calibration object 746 of FIGS. 7A and 7C, calibration objects 946 of FIGS. 9A to 9D, calibration object 1046 of FIG. 10, calibration objects 1146 and 1146' of FIGS. 11A to 11C, calibration object 1246 of FIGS. 12A and 12B, calibration object 1246' of FIG. 12C, calibration objects 1346 of FIGS. 13A to 13E) is positioned with respect to the rotating chromatic range sensor configuration of a CMM (see FIGS. 6 and 7A to 7C). The calibration object has at least a first nominally cylindrical calibration surface (see, e.g., surfaces 1148$i$ to 1148$n$ and 1148$i$' to 1148$n$' of FIGS. 11A to 11C) having a central axis that extends along a Z direction that is intended to be aligned approximately parallel to the rotation axis of the CMM. The first nominally cylindrical calibration surface is arranged at a known first radius from the central axis of the calibration object that extends along the Z direction.

The first nominally cylindrical calibration surface may include one or more reference features formed on or in the first nominally cylindrical calibration surface, such as a first set of vertical reference features (see, e.g., vertical lines 908 of FIG. 9C), a first set of angular reference features (see, e.g., angled lines 910 of FIG. 9C), etc. The reference features may be configured to be sensed by the radial distance sensing beam and located at known positions with respect to one another (e.g., angular reference features may have known angles or known angular spacings around the central axis from one another on or in the first nominally cylindrical calibration surface).

The calibration object may be arranged in a constrained relationship relative to the rotating chromatic range sensor configuration, wherein the direction of the rotation axis and the direction of the central axis are in a nominally fixed angular relationship relative to one another and are parallel to within a threshold value, for example, to within 5 degrees of one another. The calibration object may be held in the constrained relationship, for example, by a calibration gauge extension of the rotating CRS configuration (see, e.g., calibration gauge extension 744 of FIGS. 7A to 7C). The routine 1700 proceeds from 1710 to 1720.

At 1720, the routine operates the rotating chromatic range sensor configuration to provide a first set of radial distance measurement data acquired while rotating the radial distance sensing beam about the rotation axis at a first Z coordinate along the Z direction relative to the calibration object, the radial distance measurement data referenced to a sensed rotational angle of the radial distance sensing beam about the rotation axis. For example, an encoder (see encoder 630 of FIG. 6) may provide sensed rotational angle information. The routine 1700 proceeds from 1720 to 1730.

At 1730, the routine 1700 determines whether to obtain an additional set of radial distance measurement data. When it is determined at 1730 to obtain an additional set of radial distance measurement data, the routine 1700 proceeds from 1730 to 1740.

At 1740, the routine performs optional adjustments to facilitate obtaining the additional set of radial distance data, such as repositioning a stepped calibration object (e.g., calibration object 1146 of FIGS. 11A to 11C) using a calibration gauge extension (e.g., calibration gauge extension 744 of FIGS. 7A to 7C) or otherwise adjusting the position of the calibration object and/or CRS probe relative to one another, adjusting signal processing routines, etc. From 1740, the routine 1700 returns to 1720 to operate the CRS probe to obtain the additional set of radial distance measurement data.

When it is not determined at 1730 to obtain an additional set of radial distance measurement data, the routine proceeds from 1730 to 1750. At 1750, the routine 1700 processes the obtained set(s) of radial distance measurement data referenced to the sensed rotation angle to determine the calibration data, wherein the calibration data is configured to be usable to characterize or compensate radial distance measurement errors as a function of the sensed rotational angle of the radial distance sensing beam about the rotation axis. The routine 1700 proceeds from 1750 to 1760, where the routine may terminate or perform additional processing (such as storing the calibration data and/or determining additional calibration data, etc.)

Embodiments of the routine 1700 may perform more acts than illustrated, may perform fewer acts than illustrated, and may perform acts in various orders or sequences. For example, in an embodiment the routine 1700 may obtain radial distance data sets for multiple measurement distances in parallel (e.g., when taking measurements of a calibration object having multiple calibration surfaces generally aligned in a plane perpendicular to the Z axis of the rotating chromatic range sensor system (see FIGS. 12C and 13C to 13E). In an embodiment the routine 1700 may process one or more radial distance measurement data sets before the obtaining of data sets is complete. In another example, in some embodiments, the calibration information may include data obtained using an interferometer, such as ideal CRS distances associated with the optical pen, radii of one or more nominally cylindrical calibration surfaces, etc. The routine 1700 may be modified to include retrieving the data obtained using the interferometer and/or to include performing measurements using the interferometer.

As described above, a method is provided for providing calibration data for correcting misalignment errors for a rotating chromatic range sensor configuration. The rotating chromatic range sensor configuration is configured to direct a radial distance sensing beam along a radial direction relative to a rotation axis, and rotate the radial distance sensing beam about the rotation axis. A calibration object is provided which has at least a first nominally cylindrical calibration surface having a central axis that extends along a Z direction that is intended to be aligned approximately parallel to the rotation axis. The first nominally cylindrical calibration surface is arranged at a known first radius R1 from the central axis that extends along the Z direction and includes a first set of angular reference features formed on or in the first nominally cylindrical calibration surface. The angular reference features are configured to be sensed by the radial distance sensing beam and are located at known angles or known angular spacings around the central axis from one another on or in the first nominally cylindrical calibration surface. The calibration object is arranged in a relationship relative to the rotating chromatic range sensor configuration. The direction of the rotation axis and direction of the central axis are in a nominally fixed angular relationship relative to one another and are parallel to within 5 degrees of one another.

The rotating chromatic range sensor configuration is operated to provide a first set of radial distance data acquired while rotating the radial distance sensing beam about the rotation axis at a first Z coordinate along the Z direction relative to the calibration object, the radial distance data referenced to a sensed rotational angle of the radial distance sensing beam about the rotation axis. The first set of radial distance data referenced to the sensed rotation angle is processed to determine the calibration data. The calibration data is configured to be usable to characterize or compensate radial distance measurement errors as a function of the sensed rotational angle of the radial distance sensing beam about the rotation axis.

In some implementations, the method includes obtaining a first set of radial distance data and adjusting a Z relationship between the rotating chromatic range sensor configuration and the calibration object to a second Z coordinate along the Z direction relative to the calibration object, with a difference between the first and second Z coordinates known. The established nominally fixed angular relationship is not altered during the adjusting. Operating of the rotating chromatic range sensor configuration is repeated to provide a second set of radial distance data at the second Z coordinate. The first and second sets of radial distance data referenced to the sensed rotation angle are processed to determine the calibration data. The calibration data is configured to be usable to characterize or compensate radial distance measurement errors as a function of the sensed rotational angle of the radial distance sensing beam about the rotation axis.

In some implementations, the calibration object is a specialized ring gauge and the method includes mounting at least one of the rotating chromatic range sensor configuration and the specialized ring gauge on a precision Z motion stage component that is constrained to move along the Z direction. The precision Z motion stage component is operated to establish the known difference between the first and second Z relationships.

In some implementations, the first nominally cylindrical calibration surface includes at least one respective complete or partial spiral groove or ridges formed in a wall of the surface, the Z coordinate of each respective complete or partial spiral groove or ridge being known as a function of angle around the circumference of the wall of the surface.

In some implementations, the calibration object is a specialized ring gauge and the rotating chromatic range sensor configuration comprises a first ring gauge mounting feature that is integrated with the rotating chromatic range sensor configuration. The specialized ring gauge includes a mating second ring gauge mounting feature that is configured to mate to the first ring gauge mounting feature and align the specialized ring gauge according to a relationship that is a constrained relationship when so mated.

In some implementations, the rotating chromatic range sensor configuration includes an optical pen assembly comprising a housing element that houses lens elements and a rotating bearing mechanism of the rotating chromatic range sensor configuration. The first ring gauge mounting feature is integrated with the housing element of the rotating chromatic range sensor configuration.

In some implementations, the housing element and the specialized ring gauge are configured such that the specialized ring gauge may be retained on the housing element in a retracted position during a retracted time period, such that it does not obstruct or interfere with the radial distance sensing beam during normal measurement operations during the retracted time period. At a calibration time period the specialized ring gauge may be moved and retained on the housing element in a calibration position in which the calibration object is arranged in the relationship relative to the rotating chromatic range sensor configuration.

In some implementations, the calibration object includes a second nominally cylindrical calibration surface that is concentric with the first nominally cylindrical calibration surface. One of the first and second nominally cylindrical calibration surfaces is an inner surface and one is an outer surface, and at least portions of the outer surface are viewable through the inner surface.

In some implementations, the calibration object is a glass tube. The first nominally cylindrical calibration surface is an outer wall of the glass tube and the second nominally cylindrical calibration surface is an inner wall of the glass tube.

In some implementations, the calibration object includes a plurality of concentric glass tubes. The first nominally cylindrical calibration surface is a wall of one of the plurality of glass tubes and the second nominally cylindrical calibration surface is wall of another of the plurality of glass tubes.

In some implementations, the inner surface has a pattern including a plurality of windows or cuts. Portions of the outer surface are viewable through the windows or cuts of the pattern.

In some embodiments, the calibration object includes a third nominally cylindrical calibration surface. The third nominally concentric calibration surface is concentric with the first and second nominally cylindrical calibration surfaces.

In some implementations, the calibration object includes a second nominally cylindrical calibration surface having the central axis that extends along the Z direction that is intended to be aligned approximately parallel to the rotation axis. The second nominally cylindrical calibration surface is arranged at a known second radius R2 from the central axis that extends along the Z direction. The second radius R2 is different from the first radius R1.

In some implementations, the calibration object includes one or more mounting features configured to couple the calibration object to a calibration gauge extension of the rotating chromatic range sensor configuration to position the calibration object in a constrained relationship relative to the rotating chromatic range sensor configuration. In the constrained relationship, the direction of the rotation axis and the direction of the central axis are in a nominally fixed angular relationship relative to one another and are parallel to within 5 degrees of one another.

In some implementations, when the calibration object is coupled to the calibration gauge extension, the first nominally cylindrical calibration surface is configured to have a first Z relationship with the rotating chromatic range sensor configuration and the second nominally cylindrical calibration surface has a second Z relationship with the rotating chromatic range sensor configuration. A difference between the first and second Z relationships is known.

In some implementations, the one or more surface features of the calibration object comprise a flat surface and a recess.

In some implementations, one of the first and second nominally cylindrical calibration surfaces is an inner surface and one is an outer surface, and at least portions of the outer surface are viewable through the inner surface.

In some implementations, the calibration object is a glass tube. The first nominally cylindrical calibration surface is an outer wall of the glass tube and the second nominally cylindrical calibration surface is an inner wall of the glass tube.

In some implementations, the calibration object includes a plurality of concentric glass tubes. The first nominally cylindrical calibration surface is a wall of one of the plurality of glass tubes and the second nominally cylindrical calibration surface is wall of another of the plurality of glass tubes.

In some implementations, the inner surface of the calibration object has a pattern including plurality of windows or cuts through which portions of the outer surface are viewable.

In some implementations, the calibration object includes a third nominally cylindrical calibration surface that is concentric with the first and second nominally cylindrical calibration surfaces.

In some implementations, the first nominally cylindrical calibration surface includes at least one respective complete or partial spiral groove or ridges formed in a wall of the surface. A Z coordinate of each respective complete or partial spiral groove or ridge is known as a function of angle around the circumference of the wall of the surface.

In some implementations, a system is provided which includes a coordinate measurement machine (CMM), a chromatic range sensor (CRS) optical probe and a calibration object. The CMM includes light generating circuitry, wavelength detection circuitry, and CMM control circuitry. The CRS optical probe is configured to couple to the CMM and includes an optical pen having a confocal optical path including at least a confocal aperture and a chromatically dispersive optics portion. The optical pen is configured to direct a radial distance sensing beam along a radial direction relative to a rotation axis, rotate the radial distance sensing beam about the rotation axis, and focus different wavelengths at different distances along a measurement axis proximate to a workpiece surface to be measured. The calibration object is for providing calibration data for correcting misalignment errors of the CRS optical probe.

In some implementations, the CRS optical probe includes an optical pen assembly comprising a housing element that houses lens elements and a rotating bearing mechanism of the rotating chromatic range sensor configuration, and a first calibration object mounting feature that is integrated with that housing element of the CRS optical probe.

In some implementations, the housing element and the first calibration object mounting feature are configured such that the first calibration object mounting feature may be retained on the housing element in a retracted position during a retracted time period, such that the housing element and the first calibration object mounting feature do not obstruct or interfere with the radial distance sensing beam during normal measurement operations during the retracted time period. At a calibration time period the first calibration object mounting feature may be moved and retained in a calibration position during the calibration time period.

While preferred implementations of the present disclosure have been illustrated and described, numerous variations in the illustrated and described arrangements of features and sequences of operations will be apparent to one skilled in the art based on this disclosure. For example, it will be appreciated that a coordinate measurement machine as described herein may be any type of conventional coordinate measuring machine and/or may be any other type of machine utilizing an optical probe wherein coordinates are determined (e.g., a robot platform utilizing an optical probe, etc.) As another example, in addition to the CRS optical probes as described herein, other types of optical probes may also be utilized in the described systems and configurations (e.g., other non-contact white light optical probes may similarly be utilized for which the light is transmitted to the optical probe via the disclosed free-space optical fiber coupling, etc.) Various other alternative forms may also be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for providing calibration data for correcting misalignment errors for a rotating chromatic range sensor configuration that is configured to direct a radial distance sensing beam along a radial direction relative to a rotation axis, and rotate the radial distance sensing beam about the rotation axis, the method comprising:
    a) providing a calibration object having at least a first nominally cylindrical calibration surface having a central axis that extends along a Z direction that is intended to be aligned approximately parallel to the rotation axis, wherein:
        the first nominally cylindrical calibration surface is arranged at a known first radius R1 from the central axis that extends along the Z direction, and
        the first nominally cylindrical calibration surface includes a first set of angular reference features formed on or in the first nominally cylindrical calibration surface, wherein the angular reference features are configured to be sensed by the radial distance sensing beam and are located at known angles or known angular spacings around the central axis from one another on or in the first nominally cylindrical calibration surface;
    b) arranging the calibration object in a relationship relative to the rotating chromatic range sensor configuration, wherein the direction of the rotation axis and the direction of the central axis are in a nominally fixed angular relationship relative to one another and are parallel to within 5 degrees of one another;
    c) operating the rotating chromatic range sensor configuration to provide a first set of radial distance data acquired while rotating the radial distance sensing beam about the rotation axis at a first Z coordinate along the Z direction relative to the calibration object, the radial distance data referenced to a sensed rotational angle of the radial distance sensing beam about the rotation axis;
    d) adjusting a Z relationship between the rotating chromatic range sensor configuration and the calibration object to a second Z coordinate along the Z direction relative to the calibration object wherein a difference between the first and second Z coordinates is known, without altering the nominally fixed angular relationship established in step b);
    e) repeating step c) to provide a second set of radial distance data at the second Z coordinate; and
    f) processing the first and second sets of radial distance data referenced to the sensed rotation angle to determine the calibration data, wherein the calibration data is configured to be usable to characterize or compensate radial distance measurement errors as a function of the sensed rotational angle of the radial distance sensing beam about the rotation axis.

2. The method of claim 1, wherein the calibration object is a specialized ring gauge and repeating step c) to provide a second set of radial distance data at a second Z relationship between the rotating chromatic range sensor configuration and the specialized ring gauge, wherein a difference between the first and second Z relationships is known, comprises:
    mounting at least one of the rotating chromatic range sensor configuration and the specialized ring gauge on a precision Z motion stage component that is constrained to move along the Z direction in step b), and operating that precision Z motion stage component to establish the known difference between the first and second Z relationships.

3. The method of claim 1, wherein:
    the first nominally cylindrical calibration surface comprises at least one respective complete or partial spiral groove or ridges formed in a wall of the surface, the Z coordinate of each respective complete or partial spiral groove or ridge being known as a function of angle around the circumference of the wall of the surface; and
    as part of the processing the first and second sets in step f) to determine the calibration data, the calibration data is configured to be usable to characterize or compensate radial distance measurement errors and Z coordinate location errors as a function of the sensed rotational angle of the radial distance sensing beam about the rotation axis.

4. The method of claim 3, wherein the calibration object is a specialized ring gauge, the rotating chromatic range sensor configuration comprises a first ring gauge mounting feature that is integrated with the rotating chromatic range sensor configuration, and the specialized ring gauge comprises a mating second ring gauge mounting feature that is configured to mate to the first ring gauge mounting feature and align the specialized ring gauge according to a relationship that is a constrained relationship in step b), when so mated.

5. The method of claim 4, wherein the rotating chromatic range sensor configuration includes an optical pen assembly comprising a housing element that houses lens elements and a rotating bearing mechanism of the rotating chromatic range sensor configuration, and the first ring gauge mounting feature that is integrated with that housing element of the rotating chromatic range sensor configuration.

6. The method of claim 5, wherein the housing element and the specialized ring gauge are configured such that the specialized ring gauge may be retained on the housing element in a retracted position during a retracted time period, such that it does not obstruct or interfere with the radial distance sensing beam during normal measurement operations during the retracted time period, and at a calibration time period the specialized ring gauge may be moved and retained on the housing element in a calibration position conforming to step b) during the calibration time period.

7. The method of claim 1, wherein the calibration object includes a second nominally cylindrical calibration surface that is concentric with the first nominally cylindrical calibration surface, wherein one of the first and second nominally cylindrical calibration surfaces is an inner surface and one is an outer surface, and at least portions of the outer surface are viewable through the inner surface.

8. The method of claim 7, wherein the calibration object comprises at least one of:
a glass tube, wherein the first nominally cylindrical calibration surface is an outer wall of the glass tube and the second nominally cylindrical calibration surface is an inner wall of the glass tube;
a plurality of concentric glass tubes, wherein the first nominally cylindrical calibration surface is a wall of one of the plurality of glass tubes and the second nominally cylindrical calibration surface is wall of another of the plurality of glass tubes;
a third nominally cylindrical calibration surface that is concentric with the first and second nominally cylindrical calibration surfaces; or
a pattern on the inner surface including a plurality of windows or cuts through which portions of the outer surface are viewable.

9. A system, comprising:
a coordinate measurement machine (CMM) comprising:
light generating circuitry;
wavelength detection circuitry; and
CMM control circuitry;
a chromatic range sensor (CRS) optical probe configured to couple to the CMM, the CRS optical probe comprising an optical pen having a confocal optical path including at least a confocal aperture and a chromatically dispersive optics portion, the optical pen configured to direct a radial distance sensing beam along a radial direction relative to a rotation axis, rotate the radial distance sensing beam about the rotation axis, and focus different wavelengths at different distances along a measurement axis proximate to a workpiece surface to be measured; and
a calibration object for providing calibration data for correcting misalignment errors of the CRS optical probe, the calibration object comprising:
a first nominally cylindrical calibration surface having a central axis that extends along a Z direction that is intended to be aligned approximately parallel to the rotation axis, the first nominally cylindrical calibration surface arranged at a known first radius R1 from the central axis that extends along the Z direction;
a first set of angular reference features formed on or in the first nominally cylindrical calibration surface, wherein the angular reference features are configured to be sensed by the radial distance sensing beam and are located at known angles or known angular spacings around the central axis from one another on or in the first nominally cylindrical calibration surface; and
a second nominally cylindrical calibration surface having the central axis that extends along the Z direction that is intended to be aligned approximately parallel to the rotation axis, the second nominally cylindrical calibration surface arranged at a known second radius R2 from the central axis that extends along the Z direction, the second radius R2 being different from the first radius R1.

10. The system of claim 9, wherein the CRS optical probe includes an optical pen assembly comprising a housing element that houses lens elements and a rotating bearing mechanism of the rotating chromatic range sensor configuration, and a first calibration object mounting feature that is integrated with that housing element of the CRS optical probe.

11. The system of claim 10, wherein the housing element and the first calibration object mounting feature are configured such that the first calibration object mounting feature may be retained on the housing element in a retracted position during a retracted time period, such that the housing element and the first calibration object mounting feature do not obstruct or interfere with the radial distance sensing beam during normal measurement operations during the retracted time period, and at a calibration time period the first calibration object mounting feature may be moved and retained in a calibration position during the calibration time period.

12. The system of claim 11, wherein when the calibration object is coupled to the first calibration object mounting feature, the first nominally cylindrical calibration surface is configured to have a first Z relationship with the CRS optical probe and the second nominally cylindrical calibration surface has a second Z relationship with the rotating chromatic range sensor configuration, wherein a difference between the first and second Z relationships is known.

13. The system of claim 9, wherein one of the first and second nominally cylindrical calibration surfaces is an inner surface and one is an outer surface, and at least portions of the outer surface are viewable through the inner surface.

14. The system of claim 13, wherein the inner surface has a pattern including plurality of windows or cuts through which portions of the outer surface are viewable.

15. A calibration object for providing calibration data for correcting misalignment errors for a rotating chromatic range sensor configuration that is configured to direct a radial distance sensing beam along a radial direction relative to a rotation axis, and rotate the radial distance sensing beam about the rotation axis, the calibration object comprising:
- a first nominally cylindrical calibration surface having a central axis that extends along a Z direction that is intended to be aligned approximately parallel to the rotation axis, the first nominally cylindrical calibration surface arranged at a known first radius R1 from the central axis that extends along the Z direction;
- a first set of angular reference features formed on or in the first nominally cylindrical calibration surface, wherein the angular reference features are configured to be sensed by the radial distance sensing beam and are located at known angles or known angular spacings around the central axis from one another on or in the first nominally cylindrical calibration surface; and
- a second nominally cylindrical calibration surface having the central axis that extends along the Z direction that is intended to be aligned approximately parallel to the rotation axis, the second nominally cylindrical calibration surface arranged at a known second radius R2 from the central axis that extends along the Z direction, the second radius R2 being different from the first radius R1.

16. The calibration object of claim 15, comprising one or more mounting features configured to couple the calibration object to a calibration gauge extension of the rotating chromatic range sensor configuration to position the calibration object in a constrained relationship relative to the rotating chromatic range sensor configuration, wherein the direction of the rotation axis and the direction of the central axis are in a nominally fixed angular relationship relative to one another and are parallel to within 5 degrees of one another.

17. The calibration object of claim 16, wherein when the calibration object is coupled to the calibration gauge extension, the first nominally cylindrical calibration surface is configured to have a first Z relationship with the rotating chromatic range sensor configuration and the second nominally cylindrical calibration surface has a second Z relationship with the rotating chromatic range sensor configuration, wherein a difference between the first and second Z relationships is known.

18. The calibration object of claim 16, wherein the one or more mounting features comprise a flat surface and a recess.

19. The calibration object of claim 15, wherein one of the first and second nominally cylindrical calibration surfaces is an inner surface and one is an outer surface, and at least portions of the outer surface are viewable through the inner surface.

20. The calibration object of claim 19, comprising
- a glass tube, wherein the first nominally cylindrical calibration surface is an outer wall of the glass tube and the second nominally cylindrical calibration surface is an inner wall of the glass tube.

21. The calibration object of claim 15, wherein:
the first nominally cylindrical calibration surface comprises at least one respective complete or partial spiral groove or ridges formed in a wall of the surface, a Z coordinate of each respective complete or partial spiral groove or ridge being known as a function of angle around the circumference of the wall of the surface.

22. The calibration object of claim 19, comprising a plurality of concentric glass tubes, wherein the first nominally cylindrical calibration surface is a wall of one of the plurality of glass tubes and the second nominally cylindrical calibration surface is wall of another of the plurality of glass tubes.

23. The calibration object of claim 19, comprising a third nominally cylindrical calibration surface that is concentric with the first and second nominally cylindrical calibration surfaces.

24. The calibration object of claim 19, comprising a pattern on the inner surface including a plurality of windows or cuts through which portions of the outer surface are viewable.

* * * * *